(12) United States Patent
Tokura et al.

(10) Patent No.: US 6,654,353 B1
(45) Date of Patent: Nov. 25, 2003

(54) NETWORK AND NODE DEVICE

(75) Inventors: Nobuyuki Tokura, Yokosuka (JP); Haruo Yago, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/329,369

(22) Filed: Jun. 10, 1999

(30) Foreign Application Priority Data

| Jun. 12, 1998 | (JP) | 10-165406 |
| Jan. 21, 1999 | (JP) | 11-013273 |
| Feb. 23, 1999 | (JP) | 11-045406 |

(51) Int. Cl.[7] .................................................. H04L 12/40
(52) U.S. Cl. ................................................... 370/254
(58) Field of Search ................................ 370/222, 223, 370/224, 254, 255, 256, 453, 457, 257; 709/220, 221

(56) References Cited

U.S. PATENT DOCUMENTS

| 4,347,498 | A | * | 8/1982 | Lee et al. ............... 340/825.02 |
| 5,386,466 | A | * | 1/1995 | Bales et al. .................. 379/220 |
| 5,485,578 | A | * | 1/1996 | Sweazey |
| 5,732,086 | A | * | 3/1998 | Liang et al. ................. 370/410 |
| 6,496,485 | B1 | * | 12/2002 | Le .............................. 370/257 |

* cited by examiner

Primary Examiner—Kenneth Vanderpuye
(74) Attorney, Agent, or Firm—Pillsbury Winthrop LLP

(57) ABSTRACT

It is provided switching means for connecting and disconnecting a link between nodes, so that when a network has a redundant link which forms a loop among nodes—this loop preventing normal connection relationship being maintained—the connection relationship can be made normal by controlling this switching means. Controlling the switching means also achieves rapid recovery from a fault which has occurred in a link between nodes, by utilizing the aforementioned loop to form a route that bypasses the fault.

15 Claims, 15 Drawing Sheets

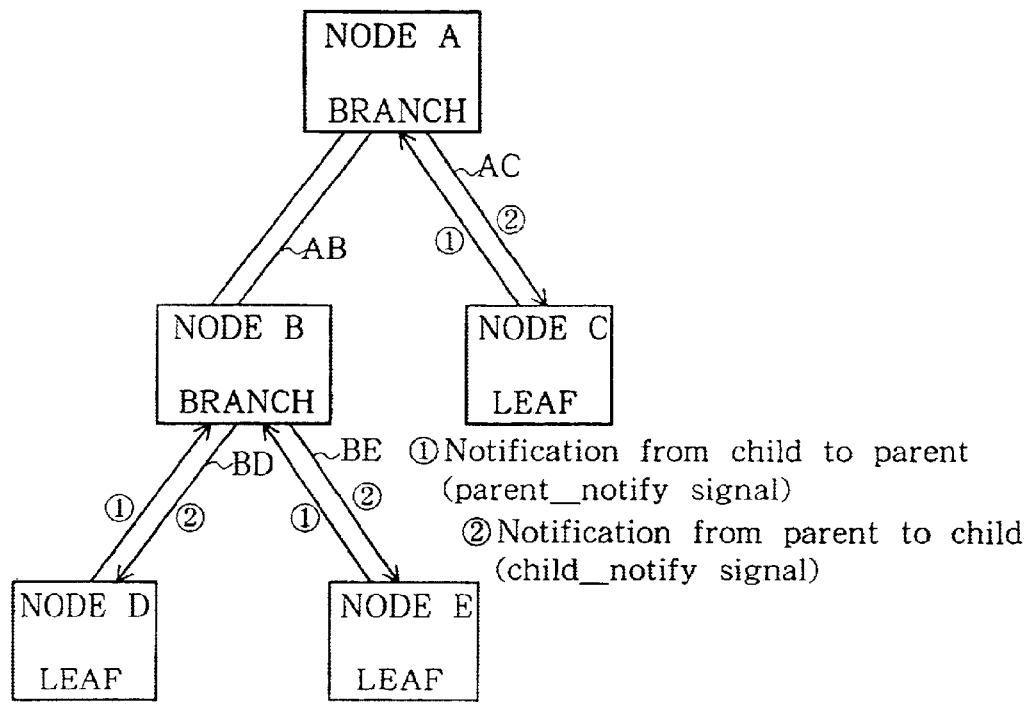
① Notification from child to parent
(parent_notify signal)
② Notification from parent to child
(child_notify signal)
FIG.20--(Prior Art)--
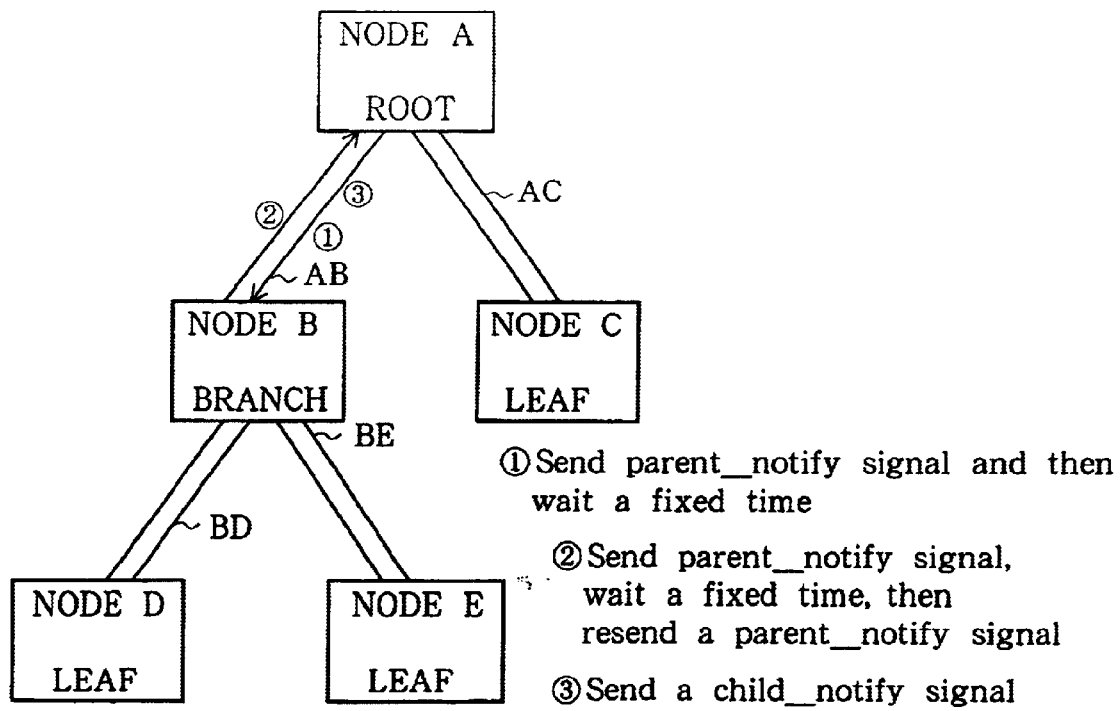
① Send parent_notify signal and then wait a fixed time
② Send parent_notify signal, wait a fixed time, then resend a parent_notify signal
③ Send a child_notify signal
FIG.21--(Prior Art)--

NETWORK AND NODE DEVICE

CROSS REFERENCE TO RELATED APPLICATIONS

The present invention claims priority from Japanese Patent Applications No. 10-165406 filed Jun. 12, 1998, No. 11-013273 filed Jan. 21, 1999 and 11-045406 filed Feb. 23, 1999, the contents of which are incorporated herein by reference.

BACKGROUND OF THE INVENTION

1. Field of the Invention

The present invention relates to networks defined in IEEE 1394 (IEEE Std 1394-1995: IEEE Standard for High Performance Serial Bus, IEEE P1394.a, and others). It relates in particular to techniques for path restoration and avoidance of incorrect connection of links.

2. Description of Related Art

In a network based on IEEE 1394, the nodes are connected in a tree topology (which combines daisy-chains and branches). To communicate, the nodes therefore have to identify the tree topology and determine the connection relations among the nodes.

This tree identification process will now be described. At power-up and when a node is added to a bus, bus initialization takes place to determine the connection relations among the nodes. This involves sending a bus reset signal to all nodes. This signal results in all information relating to the configuration of node connections being cleared. At bus initialization, the only information that each node has is whether it is a branch node connected to two or more other nodes, or a leaf node connected to just one other node, or whether it is not connected to any other node at all.

FIG. 20 and FIG. 21 give examples of how nodes identify a tree. When nodes A, B, C, D and E comprising a network are to start operating, a bus reset signal is sent to each node. The bus reset signal is a control signal for bus initialization. In these examples, if the nodes are connected by links AB, AC, BD and BE and a change occurs in the network configuration, each node detects the change and respectively sends a bus reset signal.

For example, if link AB is installed to connect node A and node B, nodes A and B each detect that link AB has been connected to it, and send a bus reset signal. If link AC is then installed to connect node A and node C, nodes A and C each detect that link AC has been connected to it, and send a bus reset signal.

Similarly, if link BD is installed to connect node B and node D, nodes B and D each detect that link BD has been connected to it, and send a bus reset signal. If link BE is installed to connect node B and node E, nodes B and E each detect that link BE has been connected to it, and send a bus reset signal.

Thus every time a new link is installed and a node is added, a bus reset signal is sent from the nodes which have detected this change. Because these bus reset signals reach each node, bus initialization takes place throughout the network. Conversely, every time an existing link is removed and the number of nodes decreased, a bus reset signal is sent from the nodes which have detected this change. Again, because these bus reset signals reach each node, bus initialization takes place throughout the network.

This process will be described in greater detail with reference to FIG. 20, where it will be seen that the first step is for signals notifying parent nodes from child nodes (parent_notify signals) are sent from all leaf nodes C, D and E to branch nodes A and B. The nodes which receive a parent_notify signal recognize the node which has sent this parent_notify signal as a child node, and send back a signal indicative of parent-to-child notification (a child_notify signal). This results in the parent-child relations among the nodes being determined.

After a fixed time has elapsed, a second step takes place. As shown in FIG. 21, this involves node A and node B each recognizing that despite having a port whereby link AB is connected, the node has received neither a parent_notify signal nor a child_notify signal, whereupon nodes A and B send a parent_notify signal to each other. When nodes A and B recognize that they have received a parent_notify signal, they each set an independent fixed time. A parent_notify signal is then sent from the node at which the fixed time first elapses. In the example of FIG. 21, it is assumed that node B has re-sent a parent_notify signal to node A. Since it is node A which has received this re-sent parent_notify signal, it constitutes the parent and sends back a child_notify signal to node B.

Thus each node receives a parent_notify signal or a child_notify signal, and thereby successively ascertains whether it is a leaf node or a branch node. Tree identification in the network takes place in this way.

FIG. 22 shows the connection relations of nodes among which a loop has been formed. If a loop forms among nodes A, B and C as shown in FIG. 22, normal connections do not hold among these nodes. That is to say, each such node has two ports at which neither a parent_notify signal nor a child_notify signal is received. Such nodes are unable to exchange parent_notify signals with the adjacent nodes to which they are mutually connected in the loop, and are unable to recognize their connection relations. If this state of affairs persists, a limited time (config_timeout) elapses and the bus is automatically reset.

This is because, in the second step described above, if a node has two ports at which neither a parent_notify signal nor a child_notify signal is received despite the relevant links being connected, that node comes under the application of a rule not to send a parent_notify signal.

The reason for this rule is that the procedure of sending parent_notify signals in the aforementioned second step has the purpose of enabling a higher-level node to be recognized. However, with a tree structure, a given node always has just one higher-level node and cannot have two. It follows that if a node has two ports at which neither a parent_notify signal nor a child_notify signal has been received despite the relevant links being connected, it judges that it is possible that there is a lower-level node which has not yet sent a parent_notify signal to it, with the result that it does not send a parent_notify signal.

Consequently, the tree identification procedure is repeated indefinitely and cannot be completed. As a result, since the initialization process cannot be completed, communication becomes impossible.

We now look at another problem. FIG. 23 shows the connection relations of nodes among which a fault has occurred. If link AB between nodes A and B is disconnected as shown in FIG. 23, then as long as the network comprising nodes A and C, and the network constituted by nodes B, D and E remain separate, these networks will undergo independent bus initialization. The result is that the two networks operate independently and cannot intercommunicate.

However, given this scenario, if link BC has been present between node B and node C as shown by the broken lines in FIG. 23, a route which bypasses the fault can be formed and normal communication performed. However, as described with reference to FIG. 22, because link BC between node B and node C would result in a loop being formed among nodes A, B and C, it cannot be provided in advance. Thus in an IEEE 1394 based network the advance provision of redundant links for path restoration in the event of link faults is problematic.

SUMMARY OF THE INVENTION

In the light of the foregoing considerations, it is an object of the present invention to provide a network and a node device whereby communication is possible even when nodes are connected in a loop. It is another object of the present invention to provide a high-reliability IEEE 1394 based network and node device which, when a fault has occurred in a link, is capable of rapidly forming a route which bypasses the fault.

It is a particular feature of the present invention that it provides switching means for connecting and disconnecting a link between nodes, so that when an IEEE 1394 based network has a redundant link which forms a loop among nodes—this loop preventing normal connection relations being maintained—the connection relations can be made normal by controlling this switching means.

Controlling the switching means also achieves rapid recovery from a fault which has occurred in a link between nodes, by utilizing the aforementioned loop to form a route that bypasses the fault.

According to a first aspect, the present invention is a network comprising a plurality of nodes and links connecting these nodes, wherein each node is provided with means for exchanging, with other nodes to which it is connected and by way of the aforementioned links, information confirming connection relations.

A particular feature of this aspect of the invention is that a node is provided with switching means which, if the node has two or more links for which the connection relations have not been confirmed after the elapse of sufficient time for exchanging the confirmation information, disconnects at least one of these links.

The switching means preferably comprises means which, when the aforementioned connection relation confirmation procedure is performed repeatedly, disconnects at least one of the links, other than a link which was previously disconnected.

A network according to the first aspect described above can also comprise: means for selecting one of the links for which the connection relations have not been confirmed after the elapse of sufficient time (Ti) for exchanging the confirmation information; means which employs the aforementioned switching means to disconnect the link selected by this selection means, and which causes there to be sent, from the node connected to the other side of this selected link, a signal which starts the exchange of information confirming the connection relations; reception detection means which detects whether or not it receives the signal which starts the exchange of information confirming the connection relations within the sufficient time (Ti) for exchanging the confirmation information; and loop detection means for detecting, in accordance with the detection results of this reception detection means, links which form a loop. Alternatively, a network according to the first aspect can comprise: means for selecting; after the elapse of sufficient time (Ti) for exchanging the confirmation information, one of the links for which the connection relations have not been confirmed; means which sends, to the link selected by this selection means, a signal which starts the exchange of information confirming the connection relations; reception detection means which detects whether or not it receives the signal which starts the exchange of information confirming the connection relations within the sufficient time (Ti) for exchanging the confirmation information; and loop detection means for detecting, in accordance with the detection results of this reception detection means, links which form a loop.

The loop detection means can alternatively comprise means which, when the reception detection means has received; via a link other than the link selected by the selection means, a signal starting the exchange of information confirming the connection relations, decides that the link selected by the selection means is a link which forms a loop. Alternatively, the loop detection means can comprise means which, when the reception detection means has received, via a link other than the link selected by the selection means, a signal starting the exchange of information confirming the connection relations, decides that this other link is a link which forms a loop.

That is to say, when there are a plurality of links for which the parent-child relation is unknown, the node that was connected to the other side of one of these links is made to send a signal which starts the exchange of information confirming the connection relations. Alternatively, the local node itself sends to this node a signal starting the exchange of information confirming the connection relations. If the signal from said node starting the exchange of information confirming the connection relations cannot be received via a link other than the link in question, it can be decided that the link in question has formed a loop, or conversely, that a link other than the link in question has formed a loop. Consequently, a normal network configuration can be formed by disconnecting either the link in question or the other link, and then making another attempt to confirm the parent-child relation. If the procedure for confirming the connection relations is performed repeatedly, the link disconnected at a given stage should not be a link which has previously been disconnected.

If the aforementioned connection relations are based on a tree topology in which the branch nodes are predetermined, the aforementioned selection means can comprise means for preferentially selecting from among links other than those connected to branch nodes. This enables a network configuration with fewer series-connected nodes to be formed.

If the aforementioned switching means is provided in each of a plurality of nodes in the same network, there is provided means which sets the aforementioned sufficient time (Ti) to a mutually different time for each of the plurality of nodes.

If the aforementioned connection relations are based on a tree topology in which the branch nodes are predetermined, the aforementioned setting means can comprise means which sets a longer sufficient time (Ti) for nodes nearer the root nodes.

That is to say, when there are a plurality of nodes with switching means in a single network, their sufficient times (Ti) are preferably set to mutually different times. This ensures that the procedure for confirming connection relations is performed in a regular order, i.e., after one node has confirmed connection relations, the next node starts to confirm connection relations. This prevents confusion occurring in the task of confirming connection relations among a plurality of nodes in the same network. If the connection relations are based on a tree topology, setting a longer sufficient time (Ti) the nearer a node is to a root node enables the confirmation of connection relations to start with nodes corresponding to branches and to proceed to nodes nearer the root. This ensures efficient confirmation of connection relations.

The switching means can comprise means for physically disconnecting a link, or it can comprise means for logically disconnecting a link. The means which disconnects logically preferably comprises means which disables the interface to which the link to be disconnected from the local node is connected.

Thus, because normal connection relations can be maintained even if a loop has been formed among nodes, a redundant link can be provided in advance in a network without concern that a loop may be formed, the redundant link serving as an alternative route in the event of a fault occurring. It follows that a high-reliability IEEE 1394 based network using branch/leaf (or parent/child) connection relations can be realized.

According to a second aspect, the present invention is a node device disposed at a node of a network according to this invention.

BRIEF DESCRIPTION OF THE DRAWINGS

FIG. 20 gives an example of the tree identification of nodes.

FIG. 21 gives an example of the tree identification of nodes.

DETAILED DESCRIPTION OF THE PREFERRED EMBODIMENTS

Figure 1:
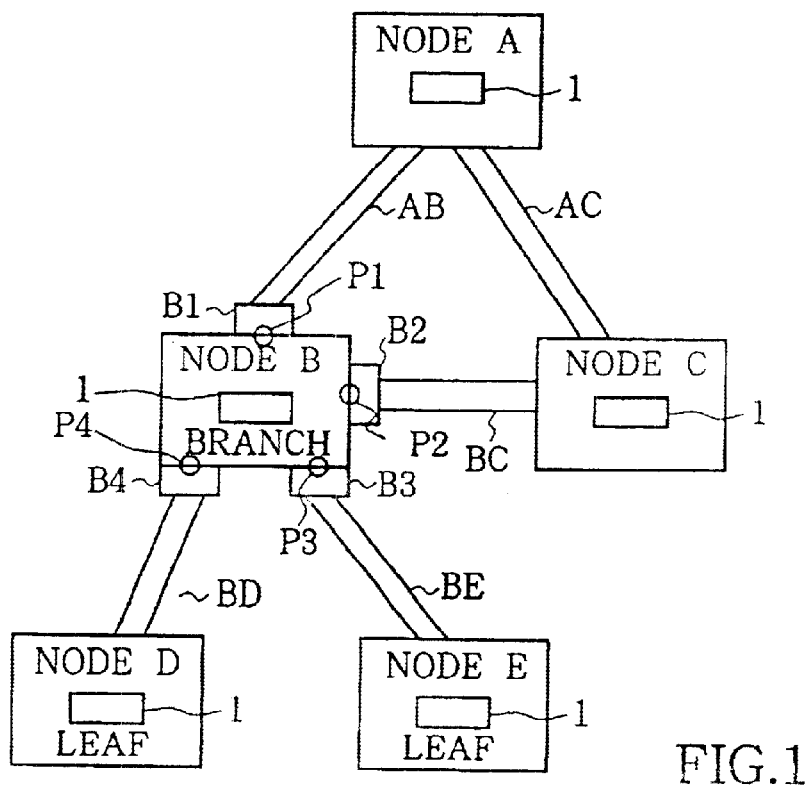
FIG. 1 shows the connection relations of nodes connected in a ring with leaves in a first embodiment of this invention.
Figure 2:
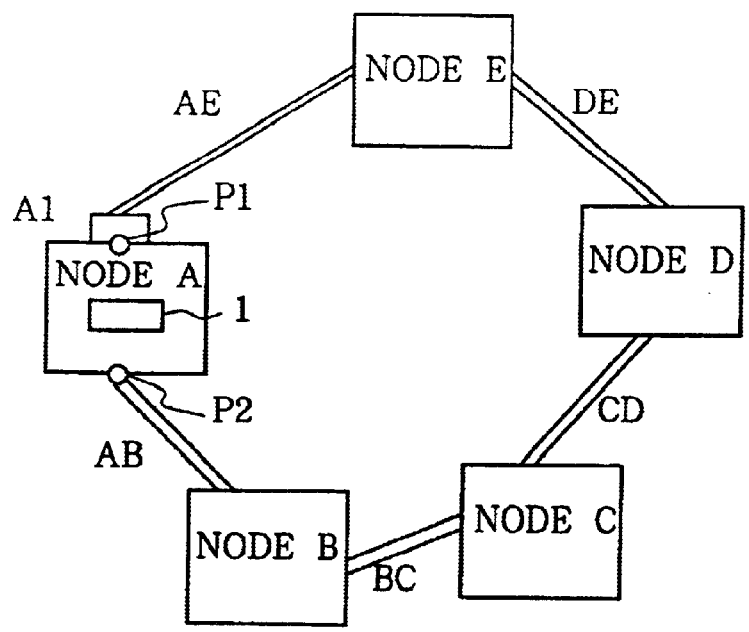
FIG. 2 shows the connection relations of nodes connected in a ring topology in a second embodiment of this invention.

General forms of working the invention will now be described with reference to FIG. 1 and FIG. 2. FIG. 1 illustrates a first embodiment of the invention and shows the connection relations of nodes connected in a tree topology. FIG. 2 illustrates a second embodiment of the invention and shows the connection relations of nodes connected in a ring topology.

As shown in FIG. 1, a first embodiment of this invention is a network comprising a plurality of nodes A, B, C, D and E, and links AB, BC, AC, BD and BE connecting the nodes, wherein each of the nodes is provided with communication controller 1 which is a means for exchanging, via a link, with another node connected to the local node, information confirming the connection relations.

A particular feature of this embodiment of the invention is that it provides switches B1, B2, B3 and B4 as switching means for disconnecting at least one of links AB, BC, BE and BD for which the connection relations have not been confirmed after the elapse of a time Ti which is sufficient for the exchange of confirmation information.

Communication controller 1 selects one of links AB, BC, BD and BE for which the connection relations have not been confirmed after the elapse of time Ti, disconnects the selected link by means of switch Bi (where i is a number from 1 to 4) and causes a bus reset signal to be sent from the node that was connected to the other side of the selected link. This is a signal which starts the exchange of information confirming the connection relation. Communication controller 1 also detects whether or not a bus reset signal is received within time Ti. The result of this detection enables a link which forms a loop to be detected.

Alternatively, communication controller 1 selects one of links AB, BC, BD and BE for which the connection relations have not been confirmed after the elapse of time Ti, sends a bus reset signal to the selected link, and detects whether or not a bus reset signal is received within time Ti. The result of this detection result enables a link which forms a loop to be detected.

If a bus reset signal has been received via a link other than a selected link, it is decided that the selected link is a link which forms a loop, or that the non-selected link forms a loop.

It is feasible to determine beforehand which of a plurality of nodes connected in a tree topology are the branch nodes, and to select preferentially from among links other than links connected to these branch nodes.

Switches B1, B2, B3 and B4 can be physical switches for physically disconnecting links AB, BC, BE and BD. Alternatively, they can be logical switches for logically disconnecting these links. A logical switch can be implemented by disabling the interface to which the link to be disconnected from local node B is connected.

As shown in FIG. 2, the present invention is also applicable to nodes A, B, C, D and E connected in a ring topology.

That is to say, a second embodiment of this invention is a network comprising a plurality of nodes A, B, C, D and E, and links AB, BC, CD, DE and AE connecting these nodes, wherein each of the nodes is provided with communication controller 1 which is a means for exchanging, via a link, with another node connected to the local node, information confirming the connection relations.

A particular feature of this second embodiment of the invention is that it provides switch A1 as switching means which, when a node has two or more links for which the connection relations have not been confirmed after the elapse of a time (Ti) which is sufficient for exchange of confirmation information, disconnects at least one of these links.

An embodiment of the present invention will now be outlined with reference to FIG. 1, which shows an IEEE 1394 based network comprising nodes A, B, C, D and E connected in a tree topology, the network having been provided with a link BC connecting node B and node C. As a result, a loop is formed among nodes A, B and C. Nevertheless, because this embodiment provides switches B1, B2, B3 and B4 at node B, which is one of the nodes comprising the loop, the formation of this loop can be avoided.

Loop formation is avoided as follows. Namely, if two ports P1 and P2 of this node B receive neither a parent_notify signal nor a child_notify signal, the connection between port P2 and link BC is disconnected by switch B2 either before or after the limited time (config_timeout) period has elapsed. It is detected, from the fact that switch B2 has operated, that link BC between node B and node C has been disconnected, whereupon node B and node C send bus reset signals. During this period, the state of switch B2 is maintained. Consequently, when bus initialization is now performed, there is no loop formation and so normal tree identification can be carried out.

Switches B1, B2, B3 and B4 can be physical switches interposed between ports P1, P2, P3 and P4 and the cables in which links AB, BC, BE and BD are established. Alternatively, they can be logical switches which disable a specific port by adjusting the impedance of the corresponding inter-node interface of node B.

This arrangement ensures that communication remains possible even when a loop is formed in an IEEE 1394 based network. Consequently, a redundant link can be established in advance in the network without concern that a loop may be formed, the redundant link serving as a precaution in case of a fault occurring in a link. In other words, if a connection between nodes has been disconnected due to a fault having occurred in a link, communication can be restored by using a redundant link to make a connection which avoids the fault.

FIG. 2 illustrates an IEEE 1394 based network comprising nodes A, B, C, D and E connected in a ring topology. The hardware configurations and algorithms of the invention are applicable to this network in similar manner to the IEEE 1394 based network illustrated in FIG. 1, where the nodes were connected in a tree topology.

Let the unavailability of the links be a, the unavailability of the switches be b, the number of nodes comprised in the link be n, the total number of links comprising the network be m, the unavailability of the network when there are no switches be a1, and the unavailability of the network where there are switches and up to two faults be a2. In this case, a1 and a2 are given by the following expressions (where a<<1):

$a1 = 1-(1-a)^m \cong ma$ $a2 = \{1-(1-a)^m(1-b)\}\{1-(1-a)^{m-1}(1-b)\}$ $\cong \{b+ma\}\{b+(m-1)a\}$ (because $a^n << a$, $n>2$)

$\cong m(m+1)a^2$ (when $a=b$)

If the network has a ring topology, unavailability can be expressed in terms of $a^2$, $b^2$ and ab. For example, if a and b are of the order of $10^{-5}$ and m is about 10, the unavailability is 1/10000, which means that reliability is high.

Thus, if a connection between nodes has been disconnected due to a fault having occurred in a link, communication can be restored by using a redundant link to make a connection which avoids the fault. In other words, a high-reliability network can be realized.

First Embodiment

Figure 3:
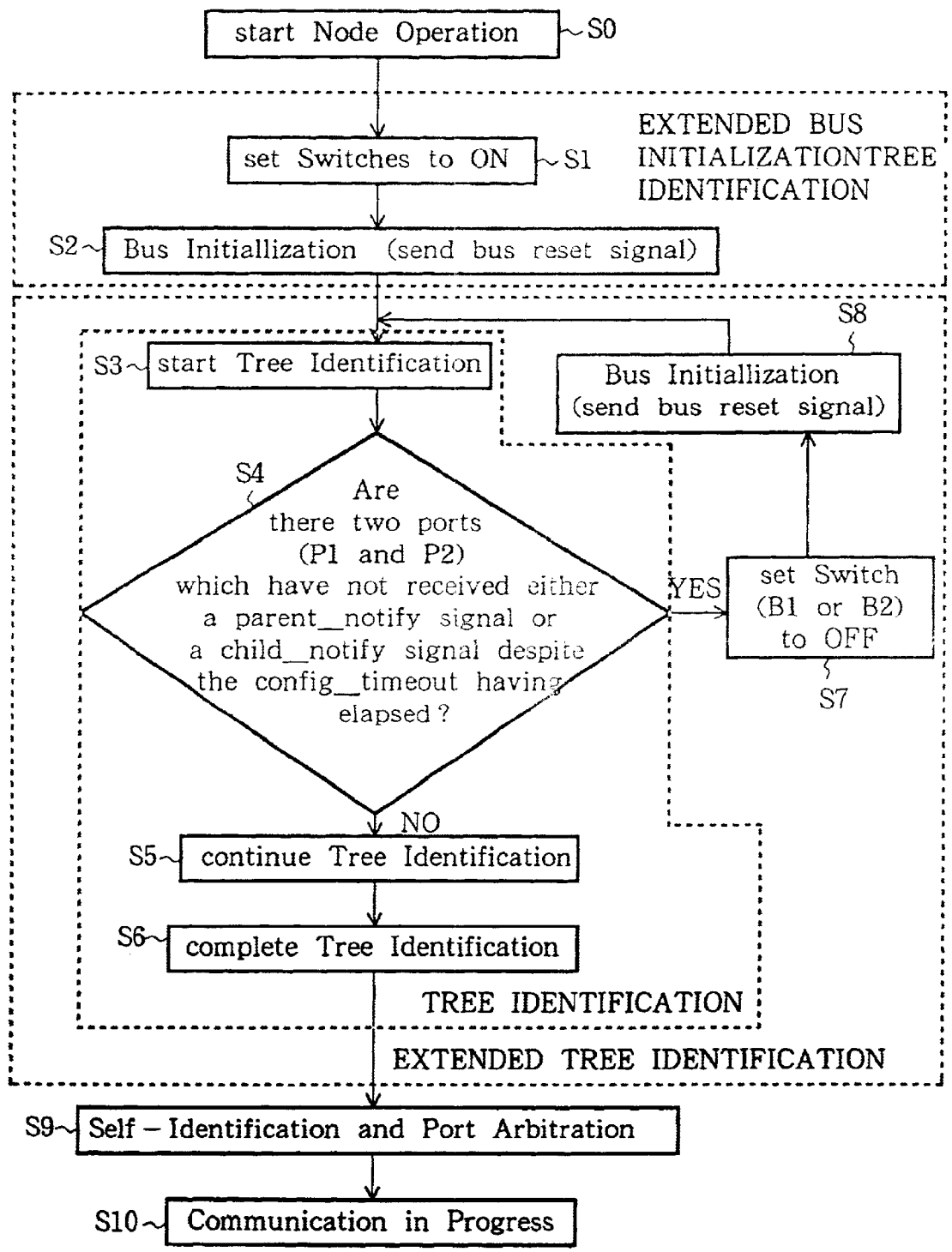
FIG. 3 is a flowchart of a procedure for loop avoidance at node B.

A first embodiment of this invention will now be described with reference to FIG. 1 and FIG. 3. FIG. 3 is a flowchart showing a procedure for loop avoidance at node B. As shown in FIG. 3, in order to start node operation (S0), switches B1, B2, B3 and B4 of node B are set to their conducting state (hereinafter referred to as being set to ON) (S1). In this embodiment, if a new link is established and a node added to the network, and a bus reset signal is sent from a node which has detected this change, each node A, B, C, D and E starts bus initialization (S2). First of all, the tree identification already mentioned in the description of the related art is started (S3). If, after the limited time (config_timeout) has elapsed, node B recognizes that it has two ports P1 and P2 which have not received either a parent_notify signal or a child_notify signal despite the relevant links being connected (S4), it sets either switch B1 or B2 to its non-conducting state (hereinafter referred to as setting the switch to OFF) (S7). It will be assumed here that node B sets switch B2 to OFF. As a result, because a change has occurred in the network configuration, node B and node C resend a bus reset signal for bus initialization (S8). This time, because switch B2 is OFF, the tree identification continues normally (S5) and in due course is completed (S6). As a result, each node A, B, C, D and E identifies its own connection relation and at the same time provides arbitration for its own ports. This latter involves enabling or disabling each of its ports in accordance with this connection relation (S9). This ensures that communication can be maintained between the nodes (S10). In this embodiment, because it was assumed that switch B2 was set to OFF, node A constitutes a branch node and node C constitutes a leaf node. If switch B1 had been set to OFF, node A would have become a leaf node and node C would have become a branch node.

In FIG. 1, each port P1–P4 of node B was provided with a corresponding switch B1–B4. However, if the ports to which the loop is connected had been known, it would have been sufficient to provide switches at those two ports P1 and P2 only.

Thus this first embodiment adds to the conventional procedure performed by each node a step of setting all the switches of a node to ON at bus initialization. This is termed "extended bus initialization ". It also adds a step of detecting a loop by identifying, at tree identification, whether or not a node has two ports at which neither a parent_notify signal nor a child_notify signal has been received by the time the limited time (config_timeout) has elapsed, and a step of setting a switch to OFF in accordance with this detection result. This is termed "extended tree identification ". Sending a bus reset signal and setting the switches to ON are preferably performed together. Likewise, sending a bus reset signal and setting a switch to OFF are preferably performed together. In each case, one or the other can be performed first, or they can be performed simultaneously.

Second Embodiment

A second embodiment of the present invention will be described with reference to FIG. 2 and FIG. 3. This second embodiment illustrates the case where the algorithm of FIG. 3 is applied to the network shown in FIG. 2, in which nodes A, B, C, D and E are connected in a ring topology. FIG. 3 is a flowchart showing a procedure for loop avoidance at node A. As shown in FIG. 3, in order to start node operation (S0), switch A1 at node A is set to ON (S1). In this embodiment, if a new link is established and a node added to the network, and a bus reset signal is sent from a node which has detected this change, each node A, B, C, D and E starts bus initialization (S2). First of all, the tree identification already mentioned in the description of the related art is started (S3). If, after the limited time (config_timeout) has elapsed, node A recognizes that it has two ports P1 and P2 which have not received either a parent_notify signal or a child_notify signal despite the relevant links being connected (S4), it sets switch A1 to OFF (S7). As a result, because a change has occurred in the network configuration, node A and node E re-send a bus reset signal for bus initialization (S8). This time, because switch A1 is OFF, tree identification continues normally (S5) and in due course is completed (S6). As a result, each node A, B, C, D and E identifies its own connection relation and at the same time provides arbitration for its own ports. This involves enabling or disabling each of its ports in accordance with this connection relation (S9). This ensures that communication can be maintained between the nodes (S10). In FIG. 2, because the port of node A to which the loop is connected is known, it is sufficient if a switch is provided at port P1 only.

Embodiment 3

Figure 4:
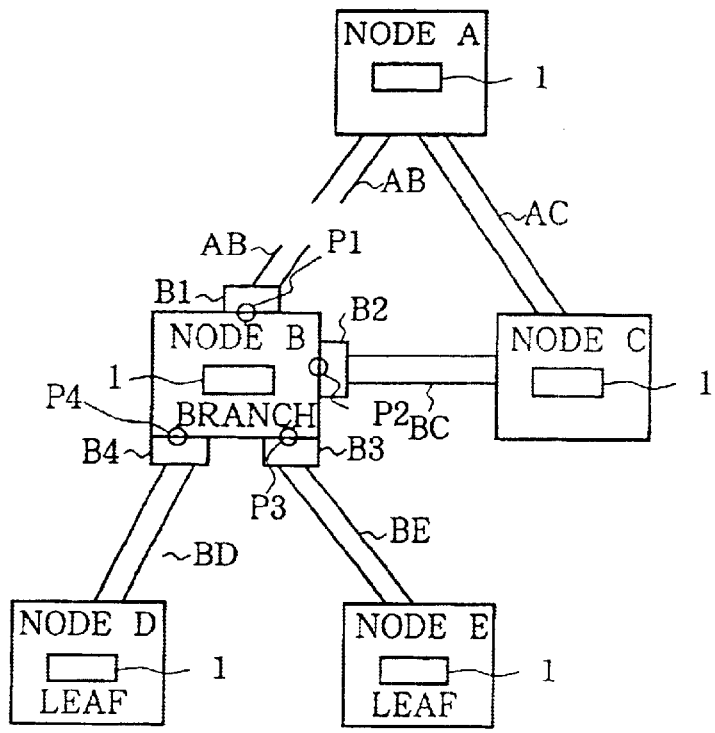
FIG. 4 shows the connection relations of nodes connected in a tree topology in a third embodiment of this invention.
Figure 6:
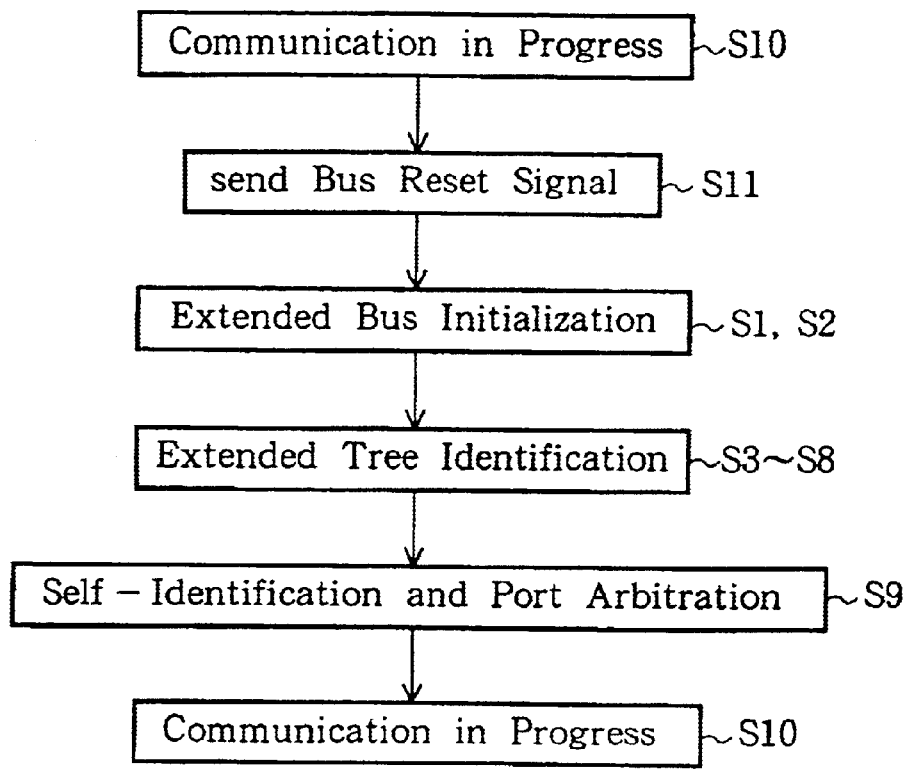
FIG. 6 is a flowchart of a procedure for loop avoidance at nodes A or B.

A third embodiment of the present invention will be described with reference to FIG. 4 and FIG. 6. FIG. 4 shows the connection relations of nodes connected in a tree topology, while FIG. 6 is a flowchart of a procedure for loop avoidance at node B. In the network shown in FIG. 1, communication was performed with switch B2 set to OFF. Under these circumstances, if link AB between node A and node B is disconnected as shown in FIG. 4, a change occurs in the network configuration, whereupon node A and node B detect this change and send a bus reset signal. The procedure shown in FIG. 3 is then performed and switch B2 of node B is set to ON, thereby avoiding the network being split into two.

Likewise, if link AC between node A and node C has been disconnected, the procedure shown in FIG. 3 is performed, switch B2 of node B is set to ON and link BC between node B and node C is restored, thereby avoiding node C ending up isolated and enabling communication to be restored.

In other words, in this third embodiment of the invention, as shown in FIG. 6, when a fault occurs in link AB or AC during communication (S10), the resulting change in the network configuration is detected by nodes A and B, or A and C, which therefore send a bus reset signal (S11). As a result, each node A, B, C, D and E performs the extended bus initialization shown in FIG. 3 (S1 and S2). They also perform the extended tree identification shown in this same FIG. (S3–S8). As a result, as described above, a route which bypasses the fault is formed, the self-identification and port arbitration indicated in FIG. 3 are carried out (S9), and communication can again be restored (S10).

In FIG. 4, a switch B1–B4 was provided at each port P1–P4 of node B, but if the ports to which the loop is connected had been known, a switch could have been provided at those two ports P1 and P2 only.

Fourth Embodiment

Figure 5:
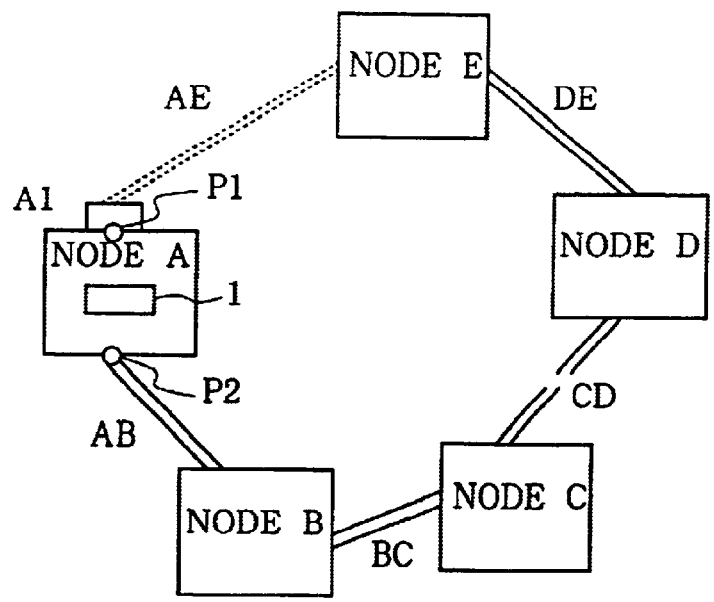
FIG. 5 shows the connection relations of nodes connected in a ring topology in a fourth embodiment of this invention.

A fourth embodiment of the present invention will be described with reference to FIG. 5 and FIG. 6. FIG. 5 shows the connection relations of nodes connected in a ring topology. This fourth embodiment illustrates the case where the algorithm of FIG. 6 is applied to the network shown in FIG. 5, in which nodes A, B, C, D and E are connected in a ring topology. FIG. 6 is a flowchart showing a procedure for loop avoidance at node A. In the network shown in FIG. 2, communication was performed with switch A1 set to OFF. Under these circumstances, if link CD between node C and node D is disconnected as shown in FIG. 5, a change occurs in the network configuration, whereupon node C and node D detect this change and send a bus reset signal. The procedure shown in FIG. 3 is then performed and switch A1 of node A is set to ON, thereby avoiding the network being split into two.

Likewise, when any one of links AB, BC and DE is disconnected, the procedure shown in FIG. 3 is performed, switch A1 of node A is set to ON and link AE between node A and node E is restored, thereby avoiding a node or nodes ending up isolated, and enabling communication to be restored.

In other words, in this fourth embodiment of the invention, as shown in FIG. 6, when a fault occurs in any one of links AB, BC, CD or DE during communication (S10), the resulting change in the network configuration is detected by corresponding nodes which therefore send a bus reset signal (S11). As a result, each node A, B, C, D and E performs the extended bus initialization shown in FIG. 3 (S1 and S2). It also performs the extended tree identification shown in this same FIG. (S3–S8). As a result, as described above, a route which bypasses the fault is formed, the self-identification and port arbitration indicated in FIG. 3 are carried out (S9), and communication can again be restored (S10). In FIG. 5, because the port of node A to which the loop is connected is known, it is sufficient if a switch is provided at port P1 only.

Fifth Embodiment

Figure 7:
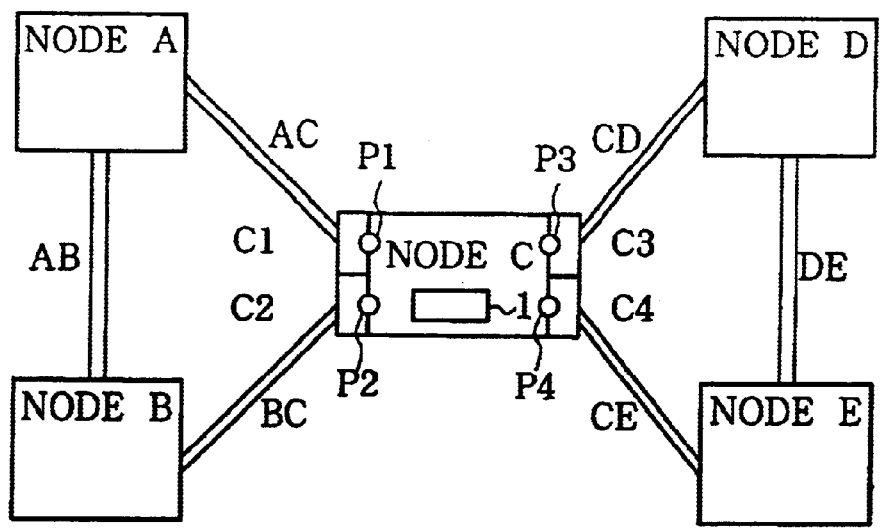
FIG. 7 shows the connection relations of nodes in a fifth embodiment of this invention.
Figure 8:
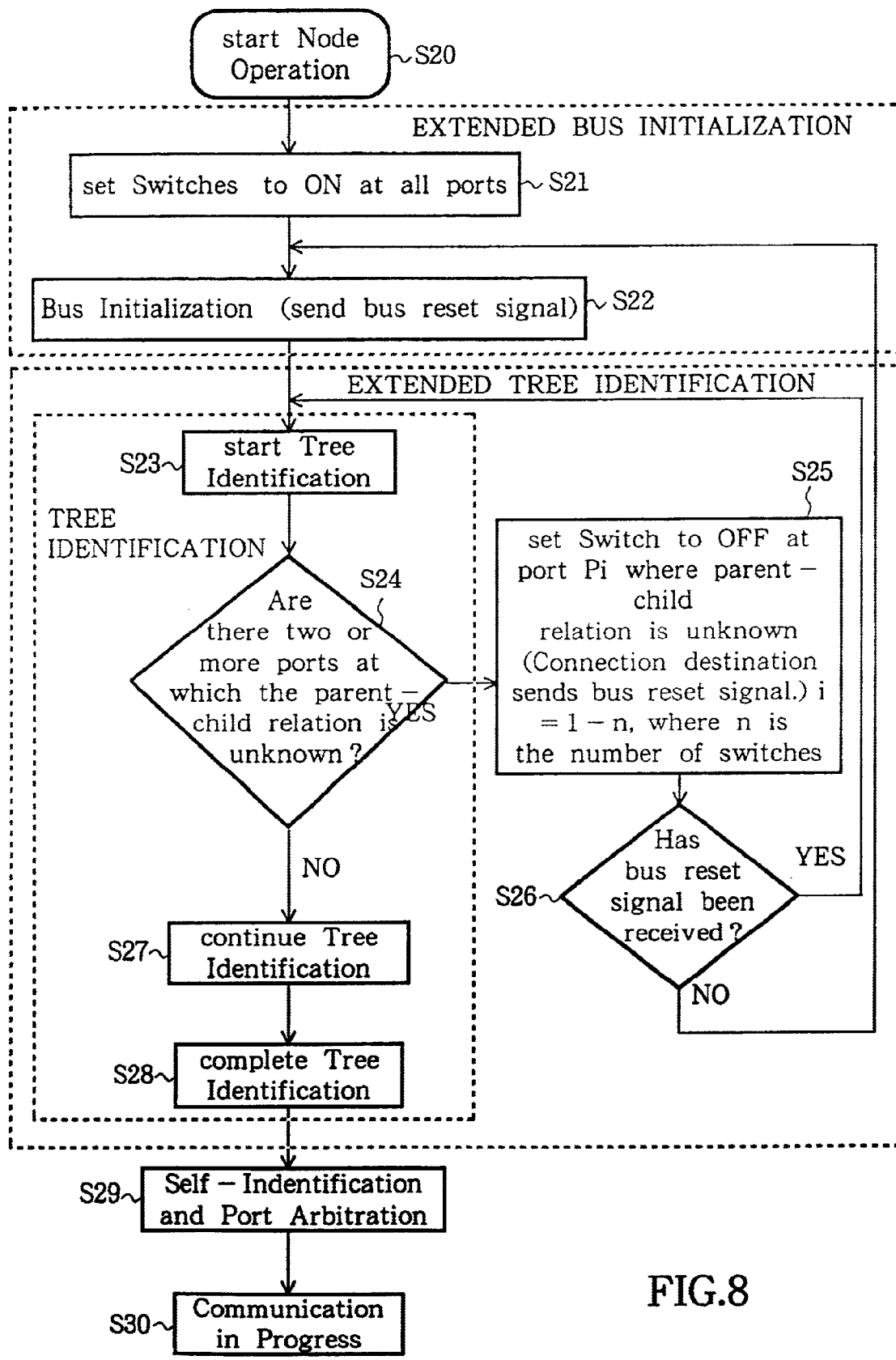
FIG. 8 is a flowchart of a procedure for loop avoidance at node C.

A fifth embodiment of the present invention will be described with reference to FIG. 7 and FIG. 8. FIG. 7 shows the connection relations of the nodes in this fifth embodiment, while FIG. 8 is a flowchart showing a procedure for loop avoidance at node C. This fifth embodiment illustrates tree recognition in a network in which a plurality of loops are connected via one node. As shown in FIG. 8, in order to start node operation (S20), node C shown in FIG. 7 sets switches C1, C2, C3 and C4 to ON (S21). In this embodiment, if a new link is established and a node added to the network, and a bus reset signal is sent from a node which has detected this change, each node A, B, C, D and E starts bus initialization (S22). First of all, the tree identification already mentioned in the description of the related art is started (S23). If, after the limited time (config_timeout) has elapsed, node C recognizes that it has four ports P1, P2, P3 and P4 which have not received either a parent_notify signal or a child_notify signal despite the relevant links being connected (S24), it takes cognizance of the fact that there is a port at which the parent-child relation is unknown, and sets the switch of that port Pi to OFF (S25). It will be assumed here that switch C3 of port P3 is set to OFF. As a result, because a change has occurred in the network configuration, node D re-sends a bus reset signal for bus initialization. However, node C is not made to send a bus reset signal. The bus reset signal sent by node D is transmitted to node C in the following order: link DE→node E→link CE. When node C receives this bus reset signal and thereby confirms that disconnected link CD had been included in a loop (S26), node C starts tree recognition again (S23). This time, because link CD is not connected, node D constitutes a leaf node and the parent-child relations among nodes D, E and C can be successively determined. Thereafter, after the limited time (config_timeout) has elapsed, node C detects ports P1 and P2 at which the parent-child relation is unknown (S24) and for example sets switch C2 of port P2 to OFF (S25). Node B then detects that a connection relation has changed and sends a bus reset signal, but node C is not made to send a bus reset signal. The bus reset signal sent by node B is transmitted to node C in the following order: link AB→node A→link AC. When node C receives this bus reset signal and thereby confirms that disconnected link BC had been included in a loop (S26), node C starts tree recognition again (S23).

This time, because link BC is not connected, node B constitutes a leaf node and the parent-child relations among nodes B, A and C can be successively determined (S27). Thus, nodes A, B and C, and nodes C, D and E respectively cease constituting loops and tree recognition can be completed (S28). This tree recognition proceeds even if child nodes or child networks are connected to nodes A, B, D and E. As a result, each node A, B, C, D and E identifies its own connection relation and provides arbitration for its own ports. This latter involves enabling or disabling each of its ports in accordance with this connection relation (S29). This ensures that communication can be maintained between nodes A, B, C, D and E (S30).

By thus including one node fitted with switches, tree recognition can be performed in a network in which there are a plurality of loops which include this node. In this fifth embodiment, because switches C2 and C3 were assumed to be OFF, nodes A and E constitute branch nodes and nodes B and D constitute leaf nodes. If switches C1 and C4 had been set to OFF, nodes B and D would have constituted branch nodes and nodes A and E would have constituted leaf nodes.

Links to be disconnected can be selected in an order which ensures that links which are preferably used as trunk links are not disconnected. This enables a network configuration with fewer series-connected nodes to be formed. The stipulations of IEEE 1394 require that, after the switches operate, no more than 16 nodes are connected in series and the number of nodes constituting a network is no more than 63.

Thus this embodiment adds to the conventional procedure a step of setting all the switches of a node to ON at bus initialization. This is the extended bus initialization. It also adds a step of detecting a loop by identifying, at tree identification, whether or not a node has two or more ports at which neither a parent_notify signal nor a child_notify signal has been received by the time the limited time (config_timeout) has elapsed, and a step of setting a switch to OFF in accordance with this detection result. This is the extended tree identification. Sending a bus reset signal and setting a switch to OFF are preferably performed together. One or the other can be performed first, or they can be performed simultaneously.

Sixth Embodiment

Figure 9:
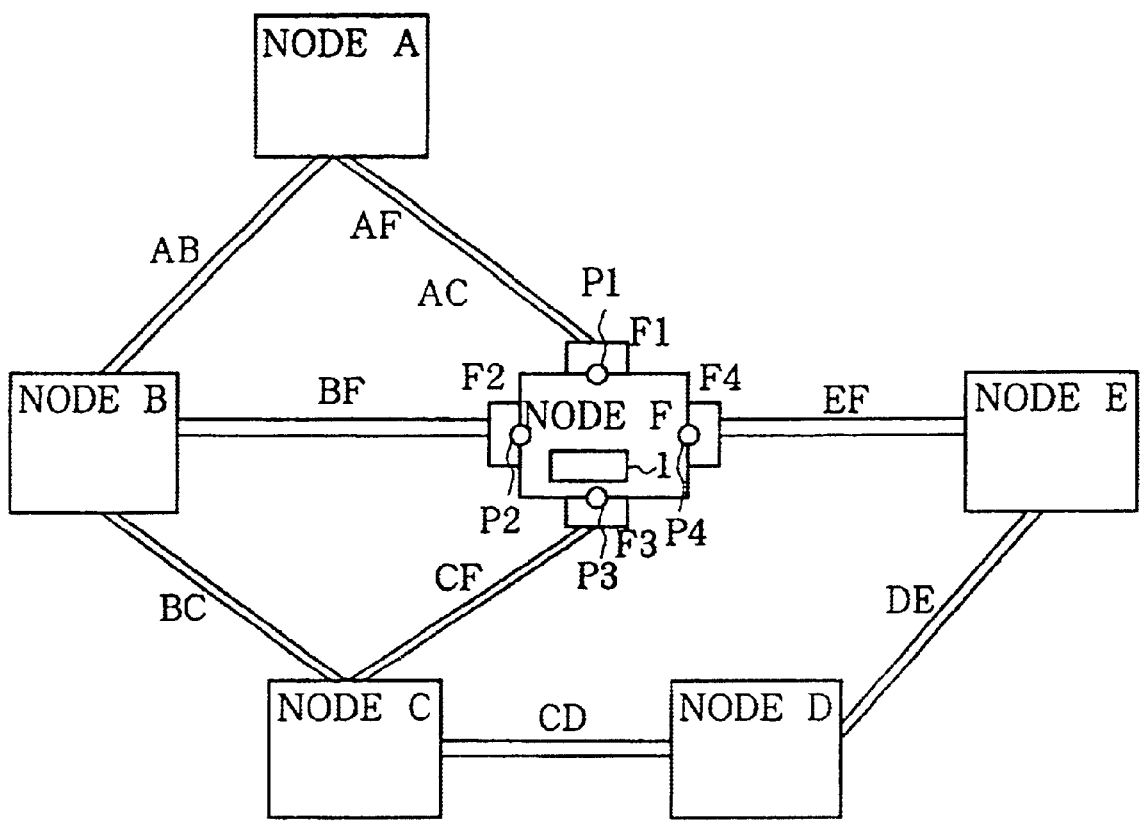
FIG. 9 shows the connection relations of nodes in a sixth embodiment of this invention.
Figure 10:
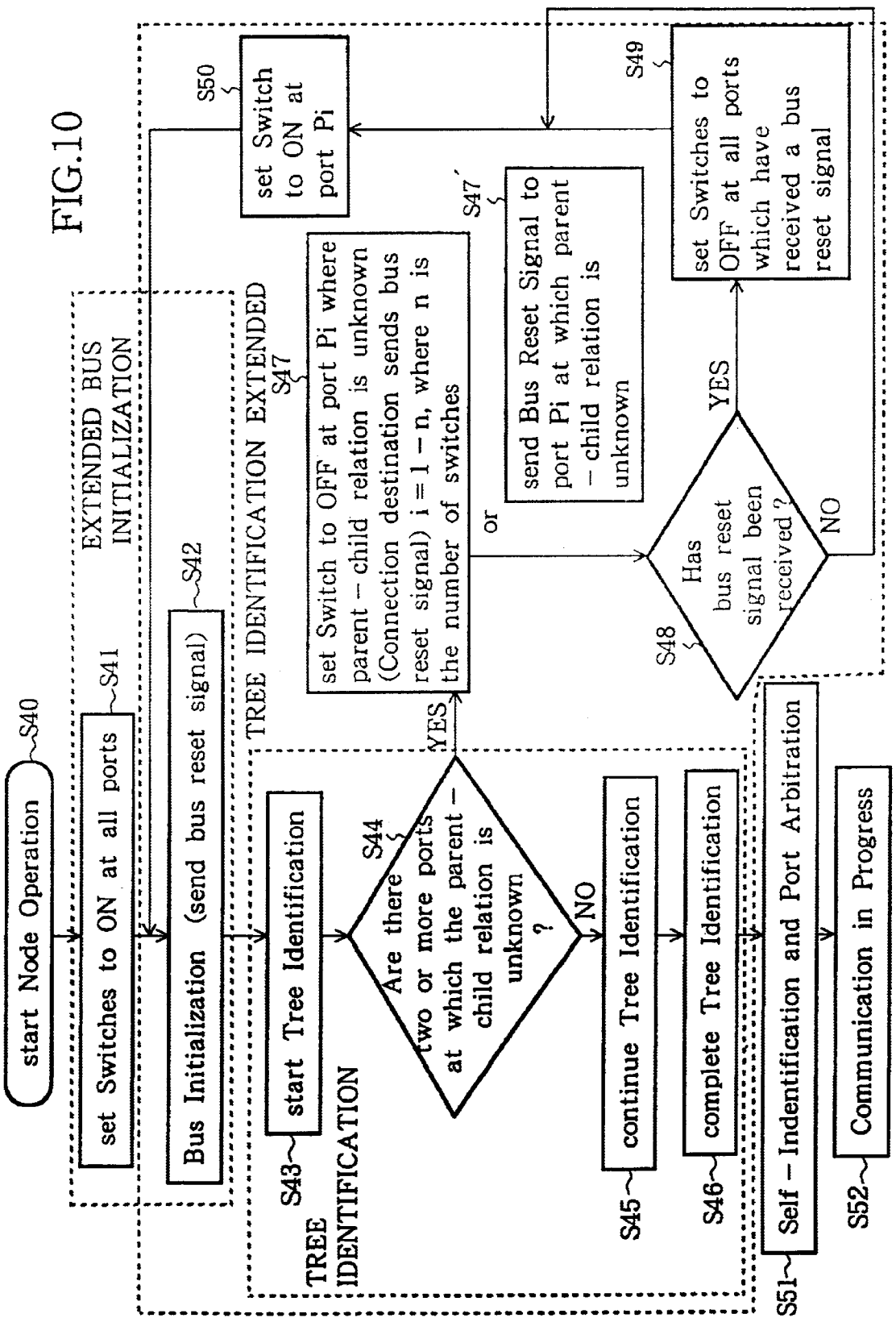
FIG. 10 is a flowchart of a procedure for loop avoidance at node F.

A sixth embodiment of the present invention is an example of tree recognition in a network in which a plurality of physically interconnected loops are connected via one node. This sixth embodiment will be described with reference to FIG. 9 and FIG. 10, of which FIG. 9 shows the connection relations of the nodes and FIG. 10 is a flowchart showing a procedure for loop avoidance at node F. As shown in FIG. 10, in order to start node operation (S40), node F sets switches F1, F2, F3 and F4 to ON (S41). In this embodiment, if a new link is established and a node added to the network, and a bus reset signal is sent from a node which has detected this change, each node A, B, C, D, E and F starts bus initialization (S42). First of all, the tree identification already mentioned in the description of the related art is started (S43). If, after the limited time (config_timeout) has elapsed, node F recognizes that it has four ports P1, P2, P3 and P4 which have not received either a parent_notify signal or a child_notify signal despite the relevant links being connected (S44), it takes cognizance of the fact that there is a port Pi at which the parent-child relation is unknown and sets one of switches F1–F4 to OFF (S47). It will be assumed here that switch F3 is set to OFF. As a result, because a change has occurred in the network configuration, node C re-sends a bus reset signal for bus initialization. However, node F is not made to send a bus reset signal. The bus reset signal sent by node C is transmitted to node F in the following orders: link CD→node D→link DE→node E→link EF; link BC→node B→link BF; and link BC→node B→link AB→node A→link AF, Node F receives these bus reset signals (S48) and immediately before the limited time (config_timeout) elapses, sets to OFF switches F1, F2 and F4 of the ports which have received the bus reset signals (S49), and restores port P3 to ON (S50). Nodes A, B, C and E detect the change in connection, send bus reset signals (S42), and start tree recognition again (S43). This time, all ports of node F receive, before the limited time (config_timeout) elapses, either a parent_notify signal or a child_notify signal (S44). Accordingly, because links AF, BF and EF are not connected, nodes A and E constitute leaf nodes and the parent-child relations among the nodes are successively determined (S45). Hence tree recognition can be completed in an efficient manner (S46). As a result, each node A, B, C, D and E identifies its own connection relation and at the same time provides arbitration for its own ports (S51). This latter involves enabling or disabling each of its ports in accordance with this connection relation. This ensures that communication can be maintained between the nodes (S52).

The same actions can also be accomplished in the following way. When node operation starts (S40), all the switches are set to ON (S41). After sending a bus reset signal (S42), tree identification is started (S43). Node F detects that after the limited time (config_timeout) has elapsed it has two or more ports at which the parent-child relation is unknown (i.e., neither a parent_notify signal nor a child_notify signal can be received at any link) (S44). Node F then detects ports P1, P2, P3 and P4 at which the parent-child relation is unknown, and sends a bus reset signal to, by way of example, port P3 alone (S47'). The bus reset signal is transmitted to node F in the following orders: link CF→node C→link CD→node D→link DE→node E→link EF; link CF→node C→link BC→node B→link BF; and link CF→node C→link BC→node B→link AB→node A→link AF. Node F receives these bus reset signals (S48) and immediately before the limited time (config_timeout) elapses, sets to OFF switches F1, F2 and F4 of the ports which have received the bus reset signals (S49), and keeps switch F3 ON (S50). Nodes A, B and E detect the changes in connection resulting from the switches being set to OFF, send bus reset signals (S42), and start tree recognition again (S43). This time, because links AF, BF and EF are not connected, nodes A and E constitute leaf nodes and the parent-child relations between the nodes are successively determined (S44, S45). Tree recognition is completed in this way (S46). As a result, each node A, B, C, D and E identifies its own connection relation and at the same time provides arbitration for its own ports (S51). This latter involves enabling or disabling each of its ports in accordance with this connection relation. This ensures that communication can be maintained between the nodes. (S52).

If the loop detection method disclosed above is used, a plurality of interconnected loops sharing the same three or more nodes can be detected at one time, and hence a particular feature of this method is that rapid tree identification is possible. This tree recognition proceeds in similar manner even if child nodes or child networks are connected to nodes. In this embodiment, because switch F3 has been set to ON, nodes B, C and D constitute branch nodes and nodes A, E and F constitute leaf nodes. The same is true if switch F2 is set to ON. If switch F1 is set to ON, nodes E and F constitute leaf nodes and nodes A, B, C and D constitute branch nodes. If switch F4 is set to ON, nodes A and F constitute leaf nodes and nodes B, C, D and E constitute branch nodes. Links to be disconnected can be selected in an order which ensures that links which are preferably used as trunk links are not disconnected. This enables a network configuration with fewer series-connected nodes to be formed. The stipulations of IEEE 1394 require that, after the switches operate, no more than 16 nodes are connected in series and the number of nodes constituting a network is no more than 63.

Thus this embodiment adds to the conventional procedure a step of setting all the switches of a node to ON at bus initialization. This is the extended bus initialization. It also adds a step of detecting a loop by identifying, at tree identification, whether or not a node has two or more ports at which neither a parent_notify signal nor a child_notify signal has been received by the time the limited time (config_timeout) has elapsed, and a step of setting a switch to OFF in accordance with this detection result. This is the extended tree identification. Sending a bus reset signal and setting a switch to OFF are preferably performed together. One or the other can be performed first, or they can be performed simultaneously.

Given the network configuration shown in FIG. 9, tree recognition can also be performed using the procedure discussed in the description of the fifth embodiment (FIG. 8). Given the network configuration of the fifth embodiment, illustrated in FIG. 7, tree recognition can also be performed using the procedure discussed in the description of the sixth embodiment (FIG. 10).

Seventh Embodiment

Figure 11:
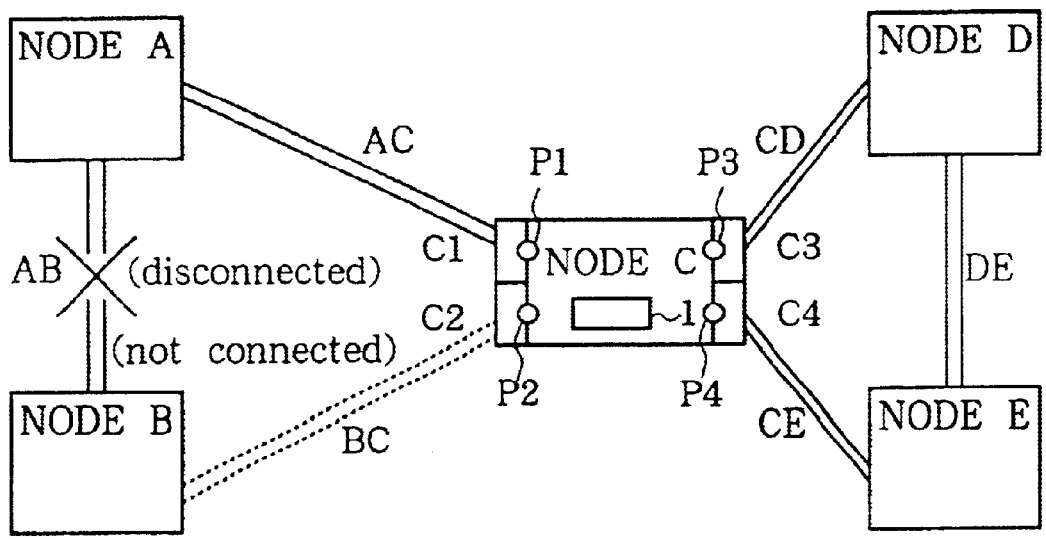
FIG. 11 shows the connection relations of nodes when a fault has occurred in a portion of a network according to a seventh embodiment of this invention.
Figure 12:
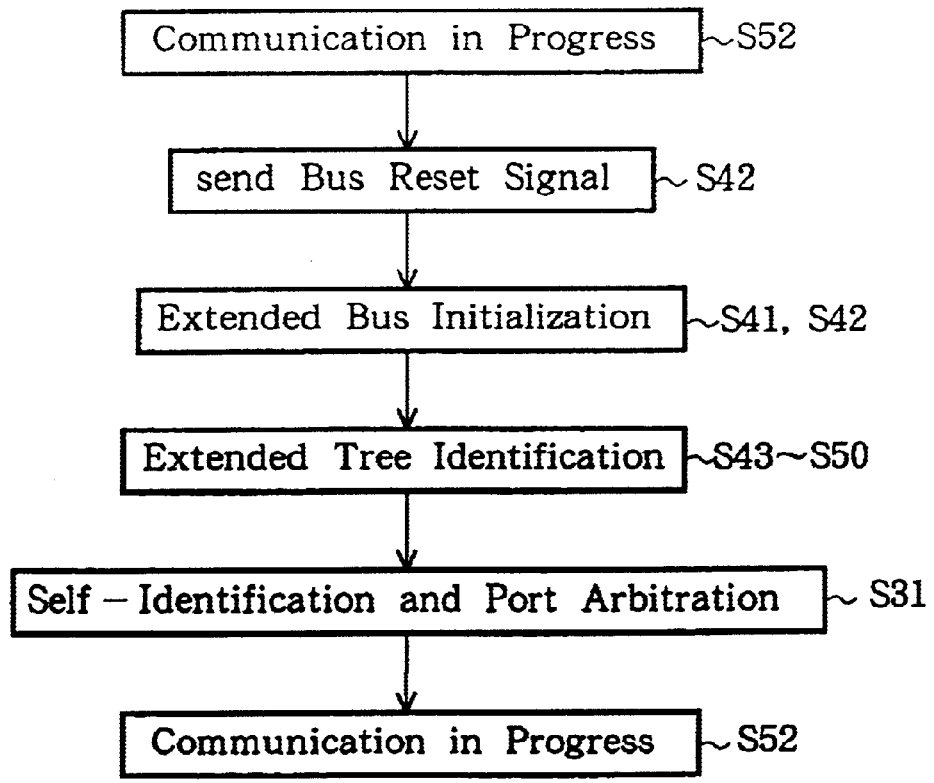
FIG. 12 is a flowchart of a procedure for loop avoidance at node F.

A seventh embodiment of the present invention is an example of path restoration in a network in which a plurality of loops are connected via one node. This seventh embodiment will be described with reference to FIG. 11 and FIG. 12. FIG. 11 shows the connection relations of the nodes when a fault has occurred in part of the network. FIG. 12 is a flowchart showing a procedure for loop avoidance at node C. In the network shown in FIG. 7, communication was performed with switches C2 and C3 set to OFF. Under these circumstances, if link AB between node A and node B is disconnected as shown in FIG. 11, a change occurs in the network configuration, whereupon node A and node B detect this change and send a bus reset signal. The procedure shown in FIG. 8 is then performed and switch C2 of node C is set to ON. In other words, because a disconnected link is reconnected, splitting of the network into two can be avoided.

Likewise, if link AC between node A and node C has been disconnected, the procedure shown in FIG. 8 is performed and switch C2 of node C set to ON, thereby avoiding the network being split into two.

Likewise, if link DE between node D and node E has been disconnected, the procedure shown in FIG. 8 is performed and switch C3 of node C set to ON, thereby avoiding the network being split into two.

Likewise, if link CE between node C and node E has been disconnected, the procedure shown in FIG. 8 is performed, switch C3 of node C is set to ON and link CD between node C and node D is restored, thereby avoiding node C ending up isolated, and enabling communication to be restored.

In other words, in this seventh embodiment of the invention, as shown in FIG. 12, when a fault occurs in link AB, CD, CE or AC during communication (S30), the resulting change in the network configuration is detected by nodes A and B which therefore send bus reset signals (S22). As a result, each node A, B, C, D and E performs the extended bus initialization shown in FIG. 8 (S21 and S22). They also perform the extended tree identification (S23–S28). As a result, as described above, a route which bypasses the fault is formed, the self-identification and port arbitration indicated in FIG. 8 are carried out (S29), and communication can again be restored (S30). Splitting of the network into two can be avoided by using the procedure shown in FIG. 10 instead of the procedure shown in FIG. 8. Links to be disconnected can be selected in an order which ensures that links which are preferably used as trunk links are not disconnected. This enables a network configuration with fewer series-connected nodes to be formed. The stipulations of IEEE 1394 require that, after the switches operate, no more than 16 nodes are connected in series and the number of nodes constituting a network is no more than 63.

In FIG. 7 and FIG. 9, each port P1–P4 of node B was provided with a corresponding switch B1–B4. However, if the ports to which the loop is connected had been known, it would have been sufficient to provide switches at those two ports P1 and P2 only.

Thus this embodiment adds to the conventional procedure a step of setting all the switches of a node to ON at bus initialization (extended bus initialization). It also adds a step of detecting a loop by identifying, at tree identification, whether or not a node has two or more ports at which neither a parent_notify signal nor a child_notify signal has been received by the time the limited time (config_timeout) has elapsed, and a step of setting a switch to OFF in accordance with this detection result (extended tree identification). Sending a bus reset signal and setting a switch to OFF are preferably performed together. One or the other can be performed first, or they can be performed simultaneously.

Eighth Embodiment

Figure 13:
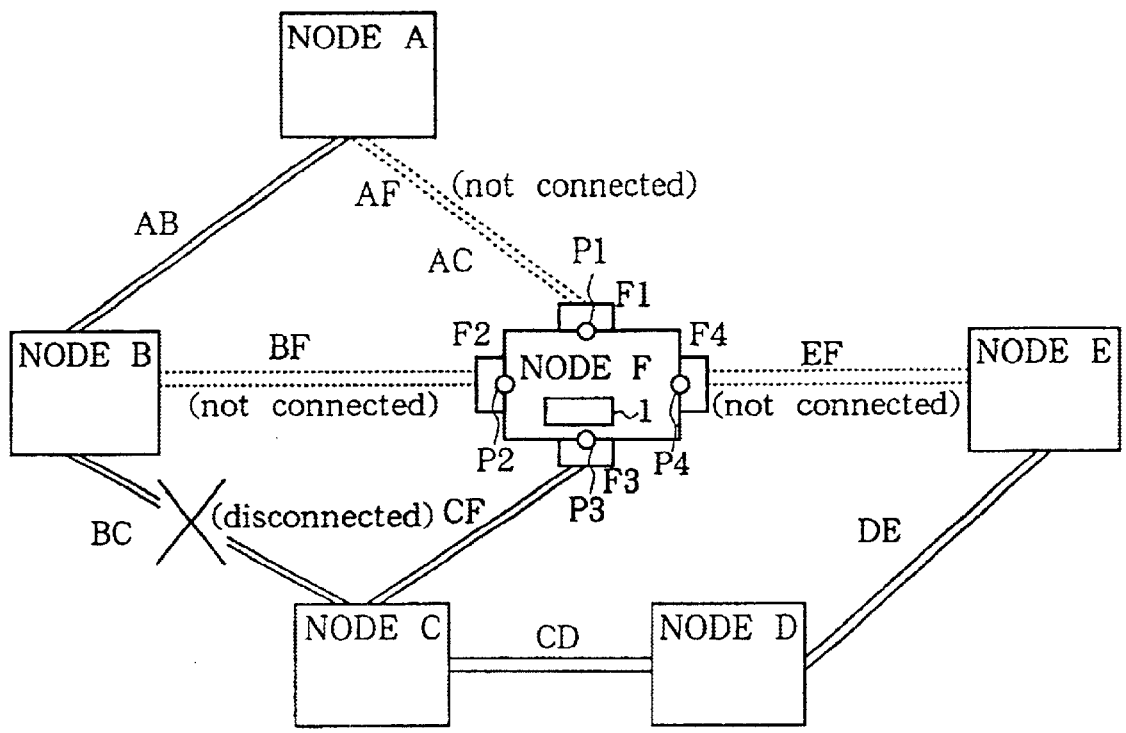
FIG. 13 shows the connection relations of nodes in an eighth embodiment of this invention.

An eighth embodiment of the present invention is an example of path restoration in a network in which a plurality of physically interconnected loops are connected via one node. This eighth embodiment will be described with reference to FIG. 13 and FIG. 12. FIG. 13 shows the connection relations of the nodes, while FIG. 12 is a flowchart showing a procedure for loop avoidance at node F. In the network shown in FIG. 9, communication was performed with switch F3 set to ON. Under these circumstances, if link BC between node B and node C is disconnected as shown in FIG. 13, a change occurs in the network configuration, whereupon node B and node C detect this change and send bus reset signals. The procedure shown in FIG. 10 is then performed and switch F1 or switch F2 of node F is set to ON. As a result, because a non-connected link is reconnected, splitting of the network into two can be avoided.

Likewise, if link AB between node A and node B has been disconnected, the procedure shown in FIG. 10 is performed and switch F1 or switch F2 of node F is set to ON, thereby avoiding the network being split into two.

Likewise, if link CD between node C and node D, or link DE between node D and node E, has been disconnected, the procedure shown in FIG. 10 is performed and switch F4 of node F is set to ON, thereby avoiding the network being split into two.

Likewise, if link CF between node C and node F has been disconnected, the procedure shown in FIG. 10 is performed, switch F1, F2 or F4 of node F is set to ON, and link AF between node A and node F, link BF between node B and node F, or link EF between node E and node F is restored, thereby avoiding node F ending up isolated, and enabling communication to be restored.

In other words, in this eighth embodiment of the invention, as shown in FIG. 12, when a fault has occurred in link BC or link AB during communication (S52), the resulting change in the network configuration is detected by nodes A and B which therefore send bus reset signals (S42). Node C receives these bus reset signals and as a result, each node A, B, C, D, E and F performs the extended bus initialization shown in FIG. 12 (S41 and S42). As a result, as described above, a route which bypasses the fault is formed, the self-identification and port arbitration indicated in FIG. 12 are carried out (S51), and communication can again be restored (S52).

Splitting of the network into two can be avoided by using the procedure shown in FIG. 8 instead of the procedure shown in FIG. 10. Links to be disconnected can be selected in an order which ensures that links which are preferably used as trunk links are not disconnected. This enables a network configuration with fewer series-connected nodes to be formed. The stipulations of IEEE 1394 require that, after the switches operate, no more than 16 nodes are connected in series and the number of nodes constituting a network is no more than 63.

In FIG. 7 and FIG. 9, each port P1–P4 of node B was provided with a corresponding switch B1–B4. However, if the ports to which the loop is connected had been known, it would have been sufficient to provide switches at those two ports P1 and P2 only.

Thus this embodiment adds to the conventional procedure a step of setting all the switches of a node to ON at bus initialization (extended bus initialization). It also adds a step of detecting a loop by identifying, at tree identification, whether or not a node has two or more ports at which neither a parent_notify signal nor a child_notify signal has been received by the time the limited time (config_timeout) has elapsed, and a step of setting a switch to OFF in accordance with this detection result (extended tree identification). Sending a bus reset signal and setting a switch to OFF are preferably performed together. One or the other can be performed first, or they can be performed simultaneously.

Ninth Embodiment

Figure 14:
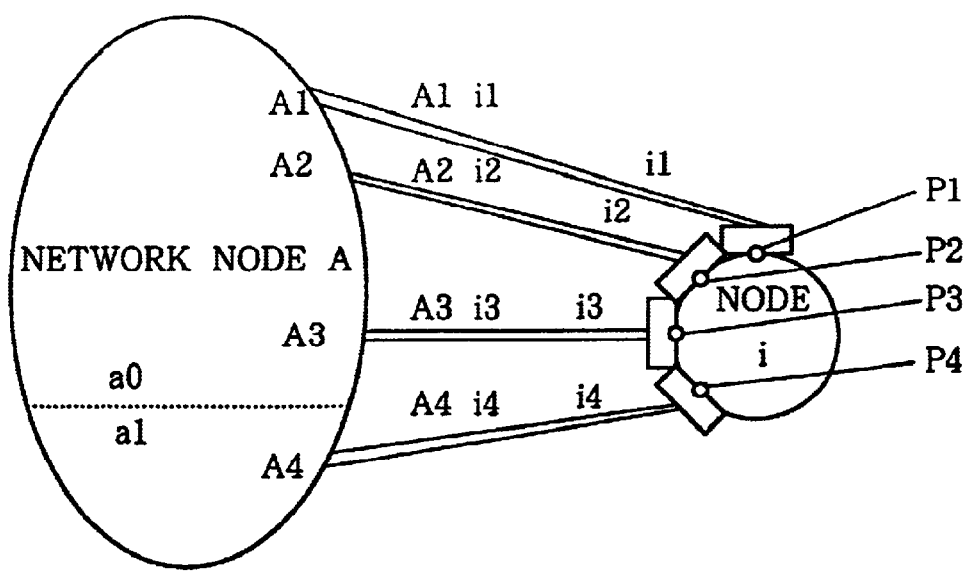
FIG. 14 shows the connection relations of nodes in a ninth embodiment of this invention.

A ninth embodiment of the present invention will be described with reference to FIG. 14 and FIG. 15. This ninth embodiment illustrates an example in which, in a network comprising a plurality of nodes fitted with switches and where the connection relations are unknown, an algorithm is used to avoid loop connections. FIG. 14 shows the connection relations of the nodes in this ninth embodiment. Network A comprises n switch-fitted nodes, and all the loop connections included in the network contain at least one switch-fitted node. In this embodiment, the limited time (config_timeout) is set to a different value for each switch-fitted node. In FIG. 14, of the n switch-fitted nodes, the connection relations between the i-th node and network A are shown. In this example, node i is assumed to be connected to arbitrary nodes A1, A2, A3 and A4 in network A, via respective links A1i1, A2i2, A3i3 and A4i4. Network A can be considered as being split into several networks which are not mutually connected other than via node i. In the present example, it is assumed that network A can be split into two networks a0 and a1.

Namely, nodes A1, A2 and A3 are mutually connected without the medium of node i, but node A4 is not connected to these other than via node i. FIG. 15 is a flowchart showing a procedure for loop avoidance at node i.

Figure 15:
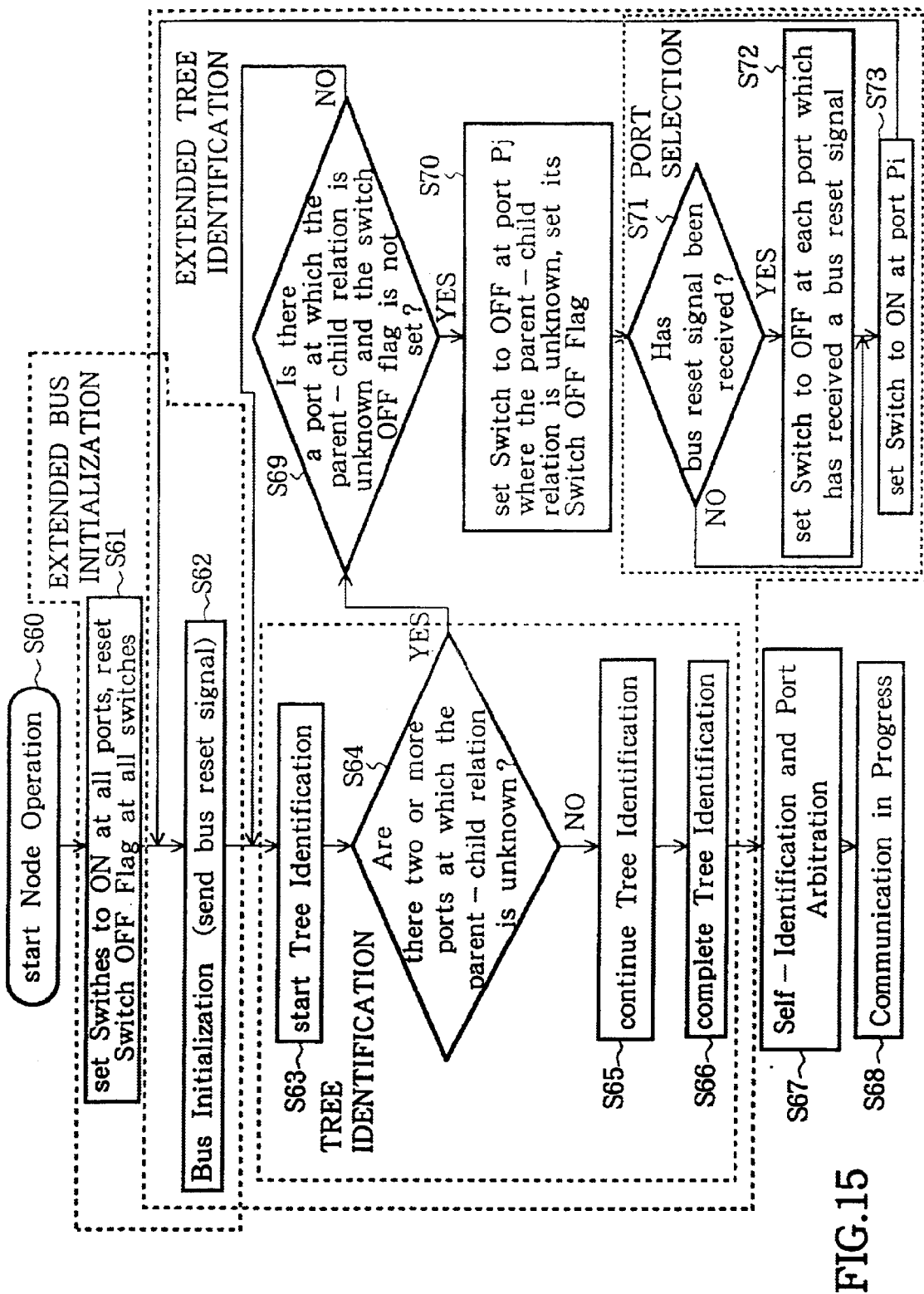
FIG. 15 is a flowchart of a procedure for loop avoidance at node i.

As shown in FIG. 15, in order to start node operation (S60), node i sets switches i1, i2, i3 and i4 to ON and, for all switches, resets the switch OFF flag (S61). In this embodiment, if a new link is established and a node added to the network, and a bus reset signal is sent from a node which has detected this change, node i and each node of network A start bus initialization (S62). First of all, tree identification is started (S63). If, after the limited time (config_timeout) has elapsed, node i recognizes that it has two or more ports P1, P2, P3 and P4 which have not received either a parent_notify signal or a child_notify signal despite the relevant links being connected (S64), it detects a port at which the parent-child relation is unknown and at which the switch OFF flag is not set (S69). Detected port Pj is set to OFF and its switch OFF flag is set (S70). In this embodiment, it is assumed that switch i3 is set to OFF. As a result, because a change has occurred in the network configuration, node A3 in network A which is connected to link A3i3 sends a bus reset signal for bus initialization. However, node i is not made to generate a bus reset (S70). The bus reset generated in network a0 is transmitted to node i in the following orders: network a0→link A1i1→node i, and network a0→link A2i2→node i. Node i receives these bus reset signals (S71) and immediately before the limited time (config_timeout) elapses, sets to OFF the switches at ports P1 and P2 which have received the bus reset signals (S72). It then restores port P3 to ON (S73). Node i then generates a bus reset (S62) and starts tree recognition again (S63).

This time, because links A1i1 and A2i2 are not connected, if node i recognizes, after the limited time (config_timeout) has elapsed, that it does not have two or more ports at which neither a parent_notify signal nor a child_notify signal has been received despite the relevant links being connected (S64), it completes the tree identification (S66) by way of a tree identification continuation step (S65). As a result, node i and nodes in each network identify their own connection relations and provide arbitration for their own ports. This latter involves enabling or disabling their ports in accordance with these connection relations (S67). This ensures that communication between node i and network A can be maintained (S68).

In the tree identification step of the example described above, the limited time (config_timeout) was set to a different value for each switch-fitted node. However, the procedure shown in FIG. 15 can also be used for tree identification in which the time remaining until tree identification is started is set to a different value for each switch-fitted node. However, it is then possible that a node which does not respond will be connected, despite the fact that it has been detected that it is connected to node i and despite relaying a bus reset signal. In this case, therefore, tree identification is performed differently. An example of this different tree identification is given below.

In the network described above, let the maximum value of the limited time (config_timeout) of the switch-fitted nodes of network a0 be Ta0; the maximum value of the limited time (config_timeout) of the switch-fitted nodes of network a1 be Ta1; and the limited time (config_timeout) of node i be Ti. Next, it will be assumed that Ta0, Ta1>Ti, and that none of nodes A1, A2, A3, A4 and A5 responds.

As shown in FIG. 15, in order to start node operation (S60), node i sets switches i1, i2, i3 and i4 to ON and, for all switches, resets the switch OFF flag (S61). In this embodiment, if a new link is established and a node added to the network, and a bus reset signal is sent from a node which has detected this change, node i and each node of network A start bus initialization (S62). First of all, tree identification is started (S63). If, after the limited time (config_timeout) has elapsed, node i recognizes that it has two or more ports P1, P2, P3 and P4 which have not received either a parent_notify signal or a child_notify signal despite the relevant links being connected (S64), it detects a port at which the parent-child relation is unknown and at which the switch OFF flag is not set (S69). Detected port Pj is set to OFF and its switch OFF flag is set (S70). In this embodiment, it is assumed that switch i3 is set to OFF. As a result, because a change has occurred in the network configuration, node A3 in network A which is connected to link A3i3 sends a bus reset signal for bus initialization. However, node i is not made to generate a bus reset (S70). The bus reset generated in network a0 is transmitted to node i in the following orders: network a0→link A1i1→node i, and network a0→link A2i2→node i. Node i receives these bus reset signals (S71) and immediately before the limited time (config_timeout) elapses, sets to OFF the switches at ports P1 and P2 which have received the bus reset signals (S72). It then restores port P3 to ON (S73). Node i then generates a bus reset (S62) and starts tree recognition again (S63).

This time, links A1i1 and A2i2 are not connected, and if node i recognizes, after the limited time (config_timeout) has elapsed, that it has two or more ports P3 and P4 at which neither a parent_notify signal nor a child_notify signal has been received despite the relevant links being connected (S64), it detects a port at which the parent-child relation is unknown and at which the switch OFF flag is not set (S69). Detected port Pj (for example, P4) is set to OFF and its switch OFF flag is set (S70). Namely, switch i4 is set to OFF. As a result, because a change has occurred in the network configuration, node A4 in network a1 which is connected to link A4i4 sends a bus reset signal for bus initialization. However, node i is not made to generate a bus reset (S70). The bus reset generated in network a1 is not transmitted to network a0, and therefore node i cannot receive the bus reset, despite the limited time (config_timeout) having elapsed (S71). Next, port P3 is restored to ON (S73). Node i then generates a bus reset (S62) and starts tree recognition again (S63). Thus, because the port that has been unable to receive the bus reset is not disconnected, separation of part of the network at tree identification and subsequent inability to sustain communication can be prevented.

This time, links A1i1 and A2i2 are not connected, and if node i recognizes, after the limited time (config_timeout) has elapsed, that it has two or more ports P3 and P4 at which neither a parent_notify signal nor a child_notify signal has been received despite the relevant links being connected (S64), it detects that it has no port at which the parent-child relation is unknown and the switch OFF flag is not set (S69). As a result, the following steps are repeated until there is a response from node A3 or node A4. Namely, tree identification is started again (S63) and if node i recognizes, after the limited time (config_timeout) has elapsed, that it has two or more ports P3 and P4 at which neither a parent_notify signal nor a child_notify signal has been received despite the relevant links being connected (S64), it detects that it has no port at which the parent-child relation is unknown and the switch OFF flag is not set (S69). If there is a response from node A3 or node A4, tree identification continues as before (S65) and waits until there is a response from another node. For example, if there is a response from node A3, the parent-child relation between node A3 and node i is determined and communication waits for node A4 (S65). When there is a response from node A4, the tree identification ends (S66). As a result, node i and the nodes of each network identify their own connection relations and provide arbitration for their own ports. This latter involves enabling or disabling their ports in accordance with these connection relations (S67). This ensures that communicate can be maintained between the networks (S68). Even when the limited times (config_timeouts) are different, tree identification can be completed in similar manner, and communication can be carried out.

Figure 16:
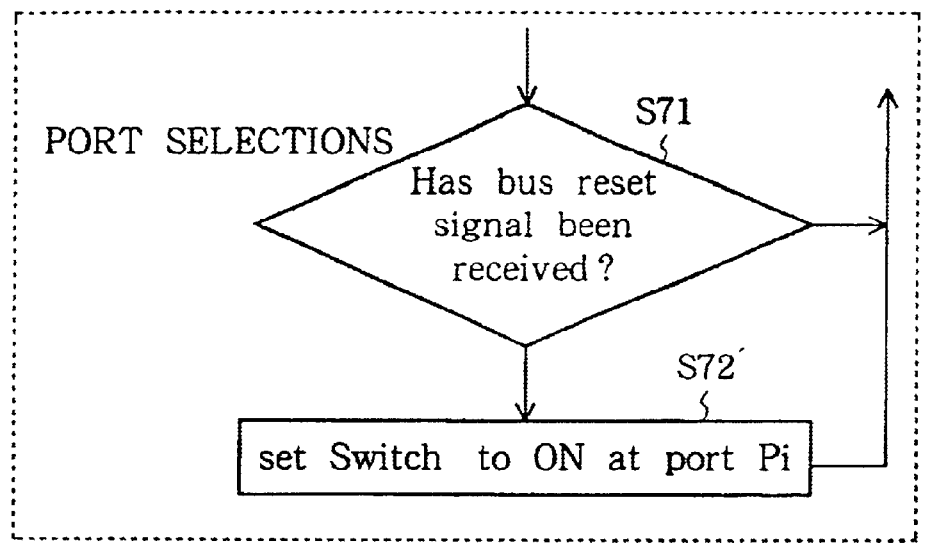
FIG. 16 is a flowchart of another procedure for loop avoidance at node i.

In this ninth embodiment, there are four connections between network A and node i, but tree identification can be performed in similar manner whether there are more or fewer connection ports that this. Moreover, in this embodiment the network was considered as being split into two, but tree identification can be performed in similar manner if it is split into three or more, or into less than two. FIG. 16 is a flowchart showing another procedure for loop avoidance at node i. In this embodiment, if node i receives a bus reset according to the port selection procedure indicated in FIG. 16 rather than the procedure shown in FIG. 15 (S71), tree recognition can be performed in similar manner by a procedure where, immediately before the limited time (config_timeout) elapses, the switch at port Pi which has received the bus reset is set to ON (S72'). Furthermore, even if successive switch-fitted nodes or networks are added and connected to such a network, provided that the network is such that all the newly formed loop connections contain at least one switch-fitted node, the tree identification method described above can be applied.

Thus, by having all the switch-fitted nodes contained in network A perform the tree identification described above, tree identification in network A can be completed and communication maintained.

Thus this embodiment adds to the conventional procedure a step of setting all the switches of a node to ON at bus initialization (extended bus initialization). It also adds a step of detecting a loop by identifying, at tree identification, whether or not a node has two or more ports at which neither a parent_notify signal nor a child_notify signal has been received by the time the limited time (config_timeout) has elapsed, and a step of setting a switch to OFF in accordance with this detection result (extended tree identification).

There is also added a loop connection detection mechanism based on causing a bus reset signal to be generated by the connection destination. Sending a bus reset signal and setting a switch to OFF are preferably performed together. One or the other can be performed first, or they can be performed simultaneously.

Tenth Embodiment

Figure 17:
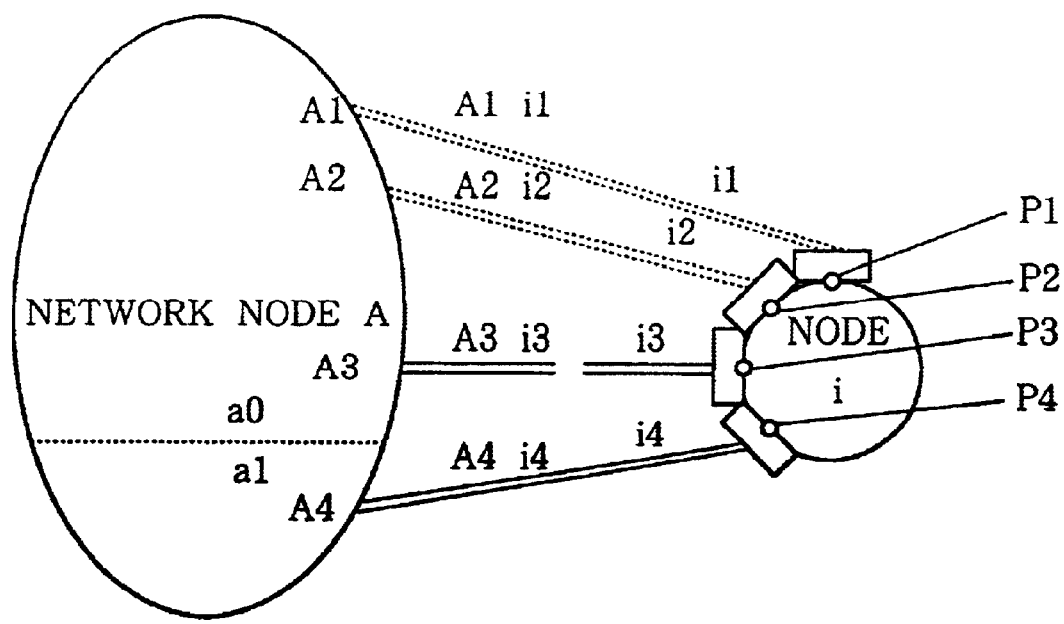
FIG. 17 shows the connection relations of nodes in a tenth embodiment of this invention.

A tenth embodiment of the present invention will be described with reference to FIG. 17 and FIG. 12. This tenth embodiment of the invention illustrates a method of path restoration in a network comprising a plurality of switch-fitted nodes at which the connection relations are unknown. FIG. 17 shows the connection relations of the nodes in this tenth embodiment. Network A comprises n switch-fitted nodes, and all the loop connections included in the network contain at least one switch-fitted node (this being a necessary condition for being able to avoid loop connections by the operation of switches). In the network shown in FIG. 14, communication was performed with switch i3 set to ON. Under these circumstances, if link A3i3 between node i and network A is disconnected as shown in FIG. 17, a change occurs in the network configuration, whereupon node i and network A detect this change and send a bus reset signal.

The procedure shown in FIG. 12 is then performed, and switch i1 or switch i2 of node i is set to ON, thereby avoiding the network being split into two.

Likewise, if link A1i1 between network A and node i has been disconnected, the procedure shown in FIG. 12 is performed and switch i2 or switch i3 of node i is set to ON, thereby avoiding the network being split into two. Likewise, if link A2i2 between network A and node i has been disconnected, the procedure shown in FIG. 12 is performed and switch i1 or i3 of node i is set to ON, thereby avoiding the network being split into two. Likewise, if link A4i4 between network A and node i has been disconnected, the procedure shown in FIG. 12 is performed and switch i1 or i2 of node i is set to ON, thereby avoiding the network being split into two.

In other words, in this tenth embodiment of the invention, as shown in FIG. 17, when a fault occurs in link A3i3 during communication (S30), the resulting change in the network configuration is detected by network A and node i, which therefore send bus reset signals (S22). As a result, node i performs the extended bus initialization indicated in FIG. 12 (S21 and S22). As a result, as described above, a route which bypasses the fault is formed, the self-identification and port arbitration indicated in FIG. 12 are carried out (S29), and communication can again be restored (S30). Links to be disconnected can be selected in an order which ensures that links which are preferably used as trunk links are not disconnected. This enables a network configuration with fewer series-connected nodes to be formed. The stipulations of IEEE 1394 require that, after the switches operate, no more than 16 nodes are connected in series and the number of nodes constituting a network is no more than 63.

Thus this embodiment adds to the conventional procedure a step of setting all the switches of a node to ON at bus initialization (extended bus initialization). It also adds a step of detecting a loop by identifying, at tree identification, whether or not a node has two or more ports at which neither a parent_notify signal nor a child_notify signal has been received by the time the limited time (config_timeout) has elapsed, and a step of setting a switch to OFF in accordance with this detection result (extended tree identification).

There is also added a loop connection detection mechanism based on causing a bus reset signal to be generated by the connection destination. Sending a bus reset signal and setting a switch to OFF are preferably performed together. One or the other can be performed first, or they can be performed simultaneously.

Eleventh Embodiment

Figure 18:
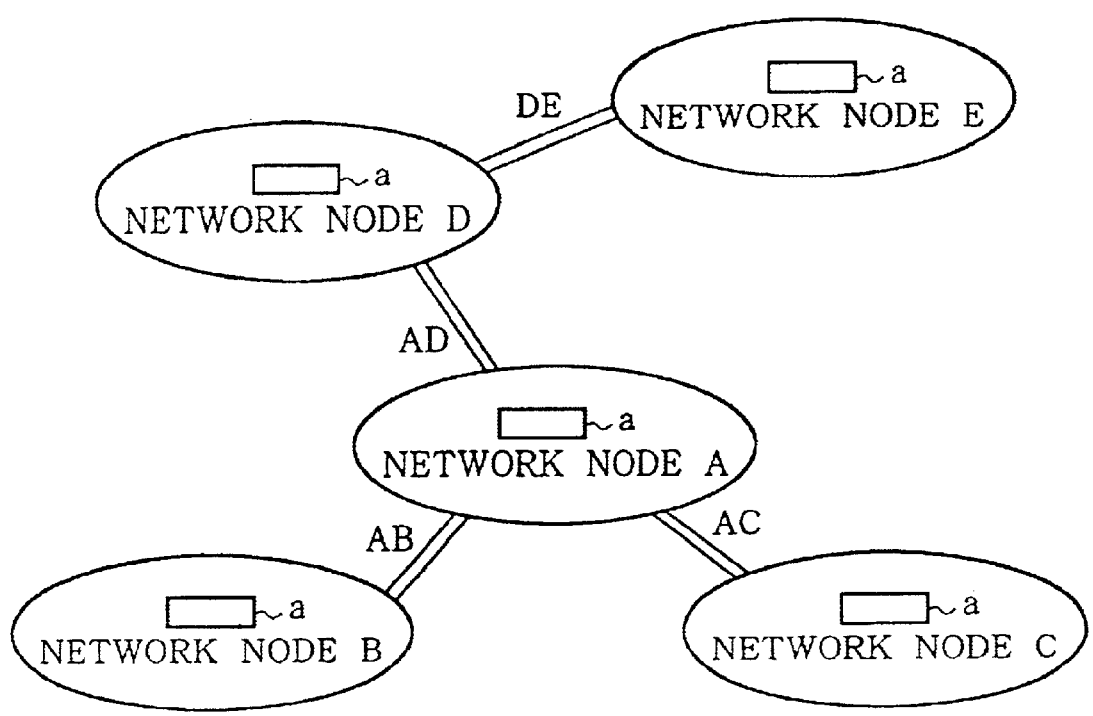
FIG. 18 shows the connection relations of networks in an eleventh embodiment of this invention.

An eleventh embodiment of the present invention will be described with reference to FIG. 18. This embodiment serves to describe the operation of the invention when a plurality of networks containing redundant systems are connected together. FIG. 18 shows the connection relations of the networks in this embodiment.

In a network, illustrated in the ninth and tenth embodiments, containing a plurality of switch-fitted nodes at which connection relations are unknown, the connection relations of the network after tree recognition has been completed are as shown in FIG. 18, which comprises a plurality of networks, for example network A, network B, network C, network D, and network E. These networks are interconnected in each case by a single link, and contain redundant systems of the sort described in the first to the eighth embodiments. Each network contains one switch-fitted node a, and a different limited time (config_timeout) is set for the tree identification in each network.

Let the limited time (config_timeout) of networks A, B, C, D and E be respectively Ta, Tb, Tc, Td and Te. If these are set so that Ta>Tb, Ta>Tc, Ta>Td and Td>Te, the connection relations of the nodes in network E are determined first, followed by the connection relations of the nodes in networks B, C and D, and finally the connection relations of the nodes in network A. Accordingly, network A contains the root node and constitutes the trunk portion of the network. The limited time Ti of the connected networks should be set to larger values as the network gets nearer the root. The limited time is not restricted to config_timeout, and can alternatively be the waiting time until node operation begins. There is no restriction on the times assigned to tree identification in the different networks, provided that they are different.

Twelfth Embodiment

A twelfth embodiment of the present invention will be described with reference to FIG. 19, which illustrates a logical switch. Each node A, B, C, D and E is provided with a plurality of ports P1–Pn, and these ports are enabled or disabled by being controlled in accordance with the connection relations of the local node. This control is performed by communication controller 1. In this twelfth embodiment, this control of the ports implements the equivalent of switches B1–B4 of node B by enabling or disabling ports.

Figure 19:
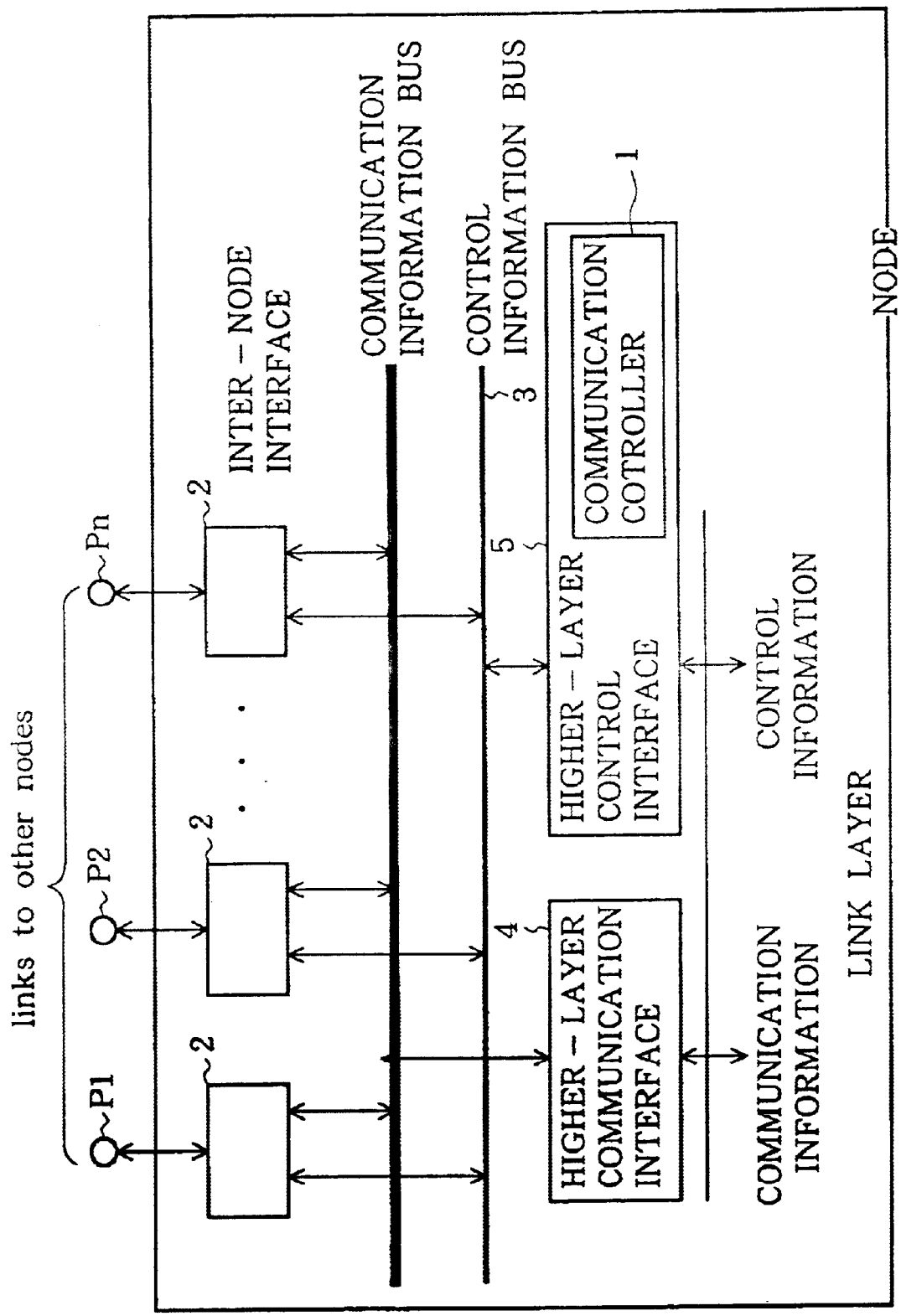
FIG. 19 shows a logical switch according to a twelfth embodiment of this invention.
Figure 22:
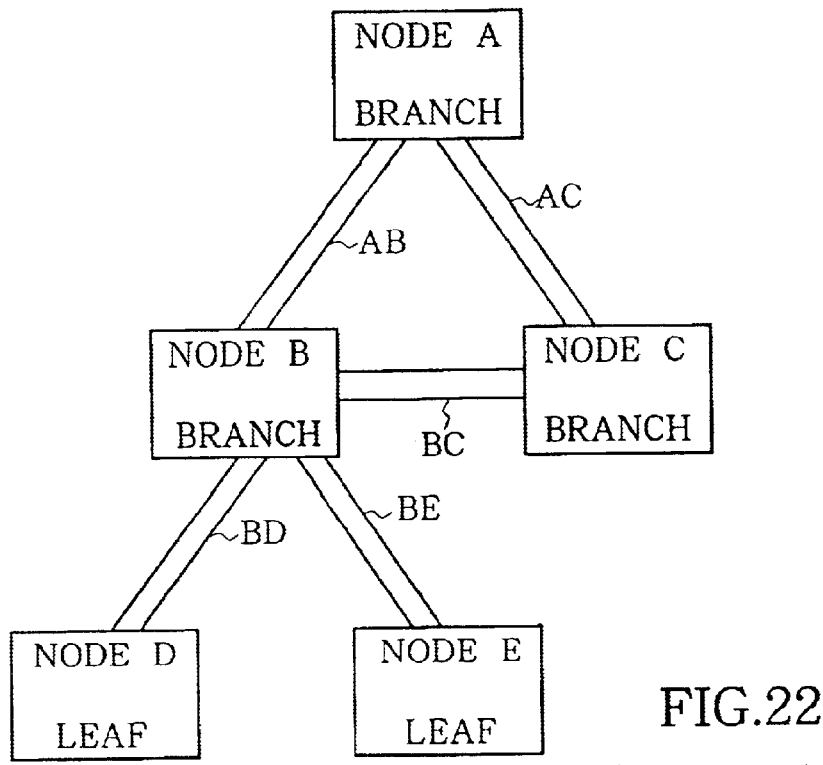
FIG. 22 shows the connection relations of nodes among which a loop has been formed.
Figure 23:
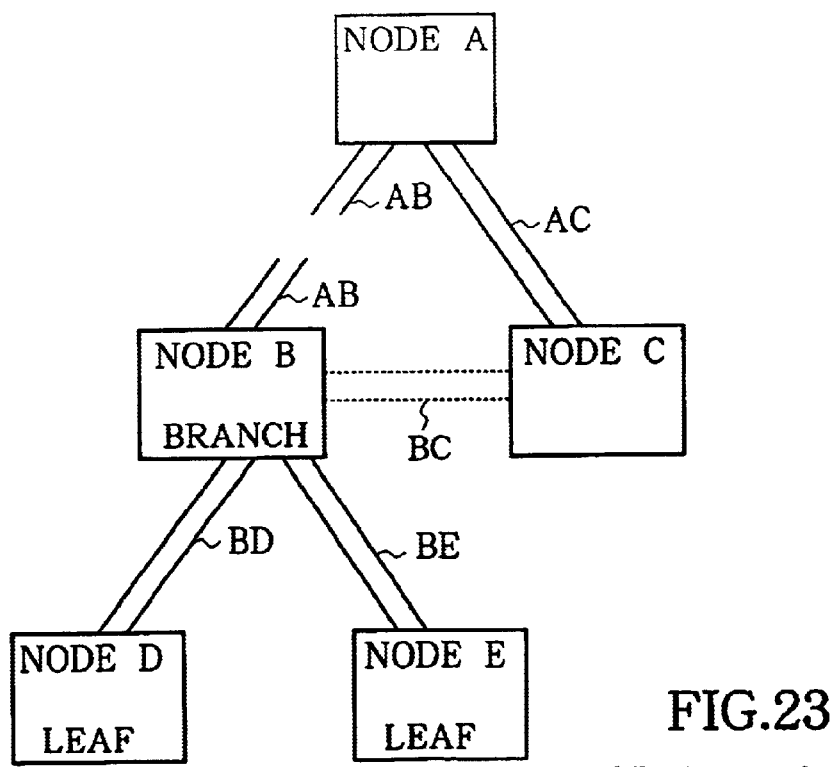
FIG. 23 shows the connection relations of nodes among which a fault has occurred.

As shown in FIG. 19, a specific inter-node interface 2 is set logically to OFF via higher-layer communication interface 4 and control information bus 3. That is to say, a port to which an interface to be disabled is connected is set to a high impedance (Z), whereby that port is set logically to OFF. In this way, links can be disconnected without using switches B1, B2, B3 and B4 for physically disconnecting links.

If a logical switch according to this twelfth embodiment is used, all the control required to implement this invention can be performed by communication controller 1, by modifying the software of communication controller 1. Accordingly, the present invention can be implemented without adding switches to nodes in the form of hardware, as was illustrated in the first and fourth embodiments, but simply by modifying the software of communication controller 1.

As has been described above, the present invention enables communication to be carried out even when nodes have been connected with a loop topology. In addition, when a fault has occurred in a link, it enables rapid formation of a route which bypasses the fault.

What is claimed is:

1. A network comprising a plurality of nodes connected using a tree topology, and links connecting these nodes, wherein each node is provided with means for exchanging, with other nodes to which it is connected and by way of the aforementioned links, information identifying the tree topology and confirming a connection relationship; wherein:

at least one of said nodes is provided with switching means which, if the node has two or more links for which a connection relationship has not been confirmed after the elapse of sufficient time (Ti) for exchanging the confirmation information, disconnects at least one of these links.

2. A network as claimed in claim 1, wherein the switching means comprises means which, when the aforementioned connection relationship confirmation procedure is performed repeatedly, disconnects at least one of the links, other than a link which was previously disconnected.

3. A network as claimed in claim 1, comprising: means for selecting one of the links for which the connection relationship has not been confirmed after the elapse of sufficient time (Ti) for exchanging the confirmation information; means which employs the aforementioned switching means to disconnect the link selected by this selection means, and which causes there to be sent, from the node connected to the other side of this selected link, a signal which starts the exchange of information confirming the connection relationship; reception detection means which detects whether or not said node receives the signal which starts the exchange of information confirming the connection relationship within the sufficient time (Ti) for exchanging the confirmation information; and loop detection means for detecting, in accordance with the detection results of said reception detection means, links which form a loop.

4. A network as claimed in claim 1, comprising: means for selecting one of the links for which the connection relationship has not been confirmed after the elapse of sufficient time (Ti) for exchanging the confirmation information; means which send to the link selected by this selection means, a signal which starts the exchange of information confirmation the connection relationship; reception detection means which detects whether or not the link receives the signal which starts the exchange of information confirming the connection relationship within the sufficient time (Ti) for exchanging the confirmation information; and loop detection means for determining, in accordance with detection by said reception means, links which form a loop.

5. A network as claimed in claim 3 or 4, wherein the loop detection means comprises means which, when the reception detection means has received, via a link other than the link selected by the selection means, a signal starting the exchange of information confirming the connection relation, decides that the link selected by the selection means is a link which forms a loop.

6. A network as claimed in claim 3 or 4, wherein the loop detection means comprises means which, when the reception detection means has received, via a link other than the link selected by the selection means, a signal starting the exchange of information confirming the connection relation, decides that this other link is a link which forms a loop.

7. A network as claimed in claim 3 or 4, wherein the connection relationship is based on a tree topology in which the branch nodes are predetermined, and the selection means comprises means for preferentially selecting from among links other than those connected to branch nodes.

8. A network as claimed in claim 1, wherein the switching means is provided in each of a plurality of nodes in the same network, and there is provided means which sets the aforementioned sufficient time (Ti) to a mutually different time for each of the plurality of nodes.

9. A network as claimed in claim 8, wherein the connection relationship is based on a tree topology in which the branch nodes are predetermined, and the aforementioned setting means comprises means which sets a longer sufficient time (Ti) for nodes nearer the root nodes.

10. A network as claimed in claim 1, wherein the switching means comprises means for physically disconnecting a link.

11. A network as claimed in claim 1, wherein the switching means comprises means for logically disconnecting a link.

12. A network as claimed in claim 11, wherein the means which disconnects logically comprises means which disables the interface to which the link to be disconnected from the local node is connected.

13. A node device disposed at a node of a network according to any one of claims 1, 2, 3, 4, 10, 11, 12.

14. A node device disposed at a node of a network according to claim 5.

15. A node device disposed at a node of a network according to claim 6.

* * * * *